US008517834B2

(12) United States Patent
Krzeslo et al.

(10) Patent No.: US 8,517,834 B2
(45) Date of Patent: Aug. 27, 2013

(54) COMPUTER VIDEOGAME SYSTEM WITH BODY POSITION DETECTOR THAT REQUIRES USER TO ASSUME VARIOUS BODY POSITIONS

(75) Inventors: Eric Krzeslo, Overijse (BE); Gilles Pinault, Brussels (BE)

(73) Assignee: Softkinetic Studios SA, Jumet (BE)

( * ) Notice: Subject to any disclaimer, the term of this patent is extended or adjusted under 35 U.S.C. 154(b) by 492 days.

(21) Appl. No.: 12/372,424

(22) Filed: Feb. 17, 2009

(65) Prior Publication Data

US 2010/0210359 A1    Aug. 19, 2010

(51) Int. Cl.
*A63F 13/06* (2006.01)
*A63F 13/02* (2006.01)
*A63F 13/10* (2006.01)

(52) U.S. Cl.
USPC .................................. 463/36; 463/9

(58) Field of Classification Search
CPC .......... A63F 13/02; A63F 13/06; A63F 13/10
USPC ..................................... 463/36, 9
See application file for complete search history.

(56) References Cited

U.S. PATENT DOCUMENTS

| | | | | |
|---|---|---|---|---|
| 5,616,078 | A * | 4/1997 | Oh ................................... | 463/8 |
| 5,630,754 | A * | 5/1997 | Rebane ............................. | 463/9 |
| 6,340,159 | B1 * | 1/2002 | Giangrante ..................... | 273/272 |
| 7,058,204 | B2 | 6/2006 | Hildreth et al. ................ | 382/103 |
| 7,227,526 | B2 | 6/2007 | Hildreth et al. ................ | 345/156 |
| 7,379,563 | B2 | 5/2008 | Shamaie ......................... | 382/103 |
| 7,379,566 | B2 | 5/2008 | Hildreth ......................... | 382/107 |
| 7,389,591 | B2 | 6/2008 | Jaiswal et al. ................. | 33/366.11 |
| 7,421,093 | B2 | 9/2008 | Hildreth et al. ................ | 382/103 |
| 7,430,312 | B2 | 9/2008 | Gu ................................... | 382/154 |
| 7,702,608 | B1 * | 4/2010 | Bererton et al. ................ | 706/46 |
| 2001/0053713 | A1 * | 12/2001 | Schultz ............................. | 463/9 |
| 2003/0013528 | A1 * | 1/2003 | Allibhoy et al. ................ | 463/42 |

(Continued)

FOREIGN PATENT DOCUMENTS

EP        0 974 382 A1      1/2000
WO    WO 2008128568 A1 *  10/2008

OTHER PUBLICATIONS

Rhythm Boxing for Wii Fit. See, E.g., http://www.youtube.com/watch?v=llsjvTz9x2g.*

(Continued)

*Primary Examiner* — Fernando L Toledo
*Assistant Examiner* — Peter Bradford
(74) *Attorney, Agent, or Firm* — Pillsbury Winthrop Shaw Pittman LLP

(57) ABSTRACT

A videogame may include providing body position challenges to one or more players to assume various target body positions at, or within, a predetermined time. Body position challenges may be provided to the one or more players by displaying body position challenge representations that prompt the one or more players to assume body positions and/or execute one or more body movements or gestures corresponding to the body position challenges. The time may be indicated via various mechanisms associated with the display (as detailed below). At a given time or over a given time interval, the videogame system may compare the player's detected body position(s) and/or movement(s) to the body position challenges to determine a degree of match or mismatch based on various criteria. Based on the results of the comparison, the game may generate a score or other feedback for display.

8 Claims, 13 Drawing Sheets

(56) References Cited

U.S. PATENT DOCUMENTS

| | | | |
|---|---|---|---|
| 2004/0021267 A1* | 2/2004 | Falciglia, Sr. | 273/269 |
| 2005/0272517 A1* | 12/2005 | Funk et al. | 473/222 |
| 2006/0045312 A1* | 3/2006 | Bernstein et al. | 382/103 |
| 2006/0046847 A1 | 3/2006 | Hashimoto | 463/36 |
| 2006/0094523 A1* | 5/2006 | Hall | 473/266 |
| 2006/0098873 A1 | 5/2006 | Hildreth et al. | 382/181 |
| 2006/0281453 A1 | 12/2006 | Jaiswal et al. | 455/423 |
| 2007/0202937 A1* | 8/2007 | Peires et al. | 463/9 |
| 2007/0235932 A1* | 10/2007 | Karwat Singer et al. | 273/256 |
| 2008/0018595 A1 | 1/2008 | Hildreth et al. | 345/156 |
| 2008/0030460 A1 | 2/2008 | Hildreth et al. | 345/156 |
| 2008/0056536 A1 | 3/2008 | Hildreth et al. | 382/103 |
| 2008/0058100 A1 | 3/2008 | Kouno | 463/31 |
| 2008/0113711 A1* | 5/2008 | Ventura et al. | 463/16 |
| 2008/0166022 A1 | 7/2008 | Hildreth | 382/107 |
| 2008/0187178 A1 | 8/2008 | Shamaie | 382/103 |
| 2008/0199071 A1 | 8/2008 | Gu | 382/154 |
| 2008/0205701 A1 | 8/2008 | Shamaie et al. | 382/103 |
| 2008/0208517 A1 | 8/2008 | Shamaie | 702/142 |
| 2008/0219502 A1 | 9/2008 | Shamaie | 382/103 |
| 2008/0235965 A1 | 10/2008 | Jaiswal et al. | 33/366.11 |
| 2008/0267447 A1 | 10/2008 | Kelusky et al. | 382/100 |
| 2008/0273755 A1 | 11/2008 | Hildreth | 382/103 |
| 2009/0003686 A1 | 1/2009 | Gu | 382/154 |
| 2009/0148000 A1* | 6/2009 | Madsen et al. | 382/107 |
| 2009/0258703 A1* | 10/2009 | Brunstetter | 463/36 |
| 2010/0151942 A1* | 6/2010 | Horovitz | 463/30 |

OTHER PUBLICATIONS

Wii Fit Jogging. See, E.g., "Wii Fit: Mother and son go jogging together", http://www.youtube.com/watch?v=KMJ9MFwAS4M.*

Allen, Nintendo Wii Fit review, PC World, May 21, 2008, http://www.pcworld.com/article/146131/review_nintendo_wii_fit.html.*

Nintendo Wii Fit Manual.*

"Fun on Monday: Human Tetris", http://blog.forperterssake.com/2008/12/fun-on-monday-human-tetris.html.*

"Hole in The Wall: Ep1/Wall1", http://www.youtube.com/watch?v=fj382AAhb9U.*

"Fun on Monday: Human Tetris", http://blog.forperterssake.com/2008/12/fun-on-monday-human-tetris.html, posted 2008, accessed Dec. 2011.*

"Hole in The Wall: Ep1/Wall1", http://www.youtube.com/watch?v=fj382AAhb9U, Uploaded on Aug. 5, 2008, accessed Dec. 2011.*

Rhythm Boxing for Wii Fit. See, E.g., http://www.youtube.com/watch?v=llsjvTz9x2g, uploaded on Jun. 27, 2008, accessed Jun. 2011.*

Nintendo Wii Fit Manual, published 2008, accessed Jun. 2011.*

Wii Fit Jogging. See, E.g., "Wii Fit: Mother and son go jogging together", http://www.youtube.com/watch?v=KMJ9MFwAS4M, Uploaded on Jan. 2, 2009, accessed Jun. 2011.*

Allen, Nintendo Wii Fit review, PC World, May 21, 2008, http://www.pcworld.com/article/146131/review_nintendo_wii_fit.html, published May 21, 2008, accessed Jun. 2011.*

* cited by examiner

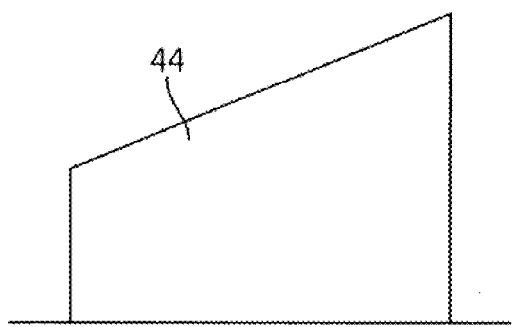
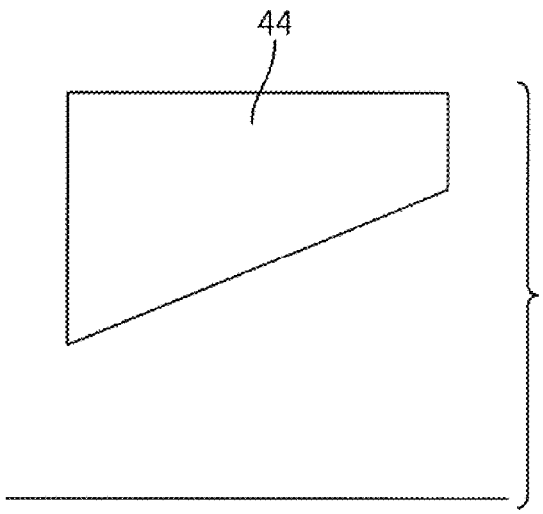
FIG. 3   FIG. 4
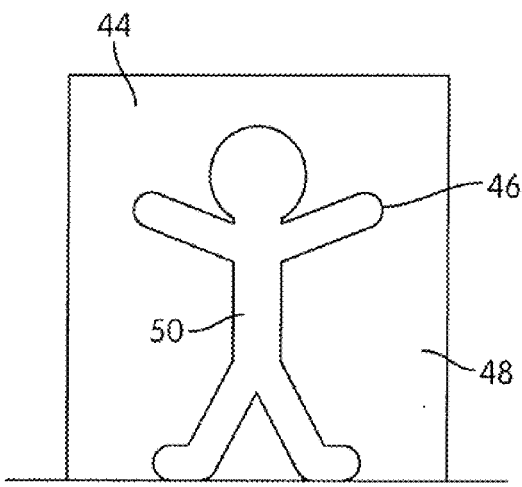
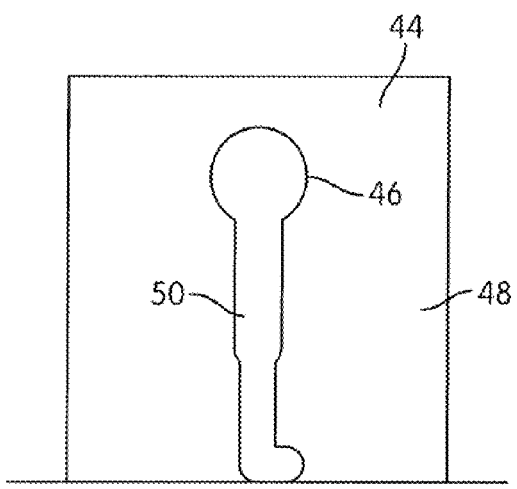
FIG. 5   FIG. 6

COMPUTER VIDEOGAME SYSTEM WITH BODY POSITION DETECTOR THAT REQUIRES USER TO ASSUME VARIOUS BODY POSITIONS

FIELD OF THE INVENTION

The invention relates to a computer videogame system including a videogame that requires players to assume various body positions based on displayed game information, detects one or more players' body positions, and compares the detected body position information to the displayed game information.

BACKGROUND OF THE INVENTION

Various videogames require a peripheral input device such as a joystick to control the input to a videogame. Other videogames (e.g., those usable on the Wii console) also use a controller that includes an accelerometer to physically detect body movement. Other types of input controllers for videogames include riding boards, touch sensitive floormats, and musical instrument-like input controllers are known.

Generally, videogames that leverage these peripherals, and require a user to execute a predetermined input at or before a predetermined time or time interval are known. For example, so-called "rhythm games" typically present a sequence of inputs that are to be executed by a user at appropriate time intervals. The match or mismatch of the inputs and/or timing of the inputs executed by the player is then analyzed to determine a score. However, the inputs dictated by conventional videogames and videogame systems merely require a particular manipulation of an input peripheral. The videogames and/or system are generally agnostic to parameters of the actual body position of the user performing the manipulation.

Various types of videogames in general are known. Most require a player to manually operate a joystick or other input device to interact with the game. Various limitations exist with these known games and user input techniques.

SUMMARY

One aspect of the invention relates to a videogame system and method, where the system includes a videogame platform associated with a display and at least a body position detector for detecting a player's body position and using the detected body position as at least one input to a videogame. According to one embodiment, the videogame may include providing body position challenges to one or more players to assume various target body positions at, or within, a predetermined time. Body position challenges may be provided to the one or more players by displaying body position challenge representations that prompt the one or more players to assume body positions and/or execute one or more body movements or gestures corresponding to the body position challenges. The time may be indicated via various mechanisms associated with the display (as detailed below). At a given time or over a given time interval, the videogame system may compare the player's detected body position(s) and/or movement(s) to the body position challenges to determine a degree of match or mismatch based on various criteria. Based on the results of the comparison, the game may generate a score or other feedback for display (or other forms of output).

As detailed below, the videogame may be implemented on various videogame platforms. Various videogame platforms are well known in the art and typically include at least one processor based device capable of running a computer software game (e.g., a computer, a gaming console, an arcade game device, and/or other processor based devices), at least one input device and at least one associated display. Other components may also be used with the game platform. One aspect of the system of the invention that differs from many videogame systems is that it can further include a body position detector as detailed below.

The body position detector can be configured to be operable to detect one or more parameters that define the position of the body of a player in space. By way of non-limiting example, the body position detector may be configured to capture two and/or three dimensional information that defines the position of the bodies of one or more players in space with respect to two or three dimensions. The two and/or three dimensional information may include one or more images of the one or more players captured sequentially and/or simultaneously (e.g., from different viewpoints), a map of the position of the bodies of the one or more players in a two dimensional space, a map of the position of the bodies of the one or more players in a three dimensional space, and/or other dimensional information. From the dimensional information captured by the body position detector, one or more body position parameters of a player may be detected. The one or more body position parameters may include the relative positions of two or more of the parts of the body of the player, a profile and/or silhouette of the player, a volume of the player, and/or other body position parameters. The relative positions of two or more of the parts of the body of the player may include, for example, the positions of the two or more of the head, torso, legs (individually), arms (individually), feet (individually), and/or hands (individually) relative to each other.

From the two and/or three dimensional information captured by the body position detector, parameters related to the position and/or motion of players other than the one or more body position parameters may be determined. The one or more other parameters may include, for example, depth information that represents the distance of the player from a real or virtual reference plane (as detailed below), information related to pose (e.g., the maintenance of the relative positions of the body parts of the player), information related to gesture (e.g., coordinated movement of one or more body portions), information related to location (e.g., within a room, with respect to the ground, and/or other location information), information related to directional orientation, information related to motion (e.g., speed, inertia, acceleration, rhythm, and/or other information), information related to size, information related to volume, and/or other information. For example, some aspects of the game may require the player to move laterally, perform one or more gestures, and/or hold one or more poses.

To enable the videogame to be played by more than one person, more than one body position detector may be used and/or each body position detector may be capable of simultaneously discerning between and detecting two or more players (as detailed below).

The one or more processors may include one or more processing units configured to execute modules. The modules may be configured to process player information received as input from the body position detector (and/or other inputs), including dimensional information defining the position of the bodies and/or body parts of one or more players in space. Such player information may include a number of players, identifications of individual players, identified body parts of individual players, relative positions of the identified body parts, information related to pose, information related to location, information related to orientation, information related to gestures, information related to motion, and/or other player information.

According to one embodiment, the videogame may generally include as one aspect of the game, providing body position challenges to one or more users. The body position challenges may be provided by displaying body position challenge representations that prompt one or more players to assume various target body positions that correspond to the body position challenges, for or within a predetermined time, determining player information, including body position information for one or more players, at a given time or over a given time interval and comparing the body position information to the body position challenge to determine a degree of match and/or mismatch between the actual body position of the one or more players and the target body positions. Based on this comparison the game may generate and output a score and/or other feedback for the one or more players. Other scoring and feedback criteria may also be used.

A body position challenge representation may convey the target body position of a body position challenge in a variety of ways. By way of example, the body position challenge representation may include a display of one or more objects that the player must try to avoid (e.g., an opening in a wall or other structure), one or more objects the player must try to contact, a graphical depiction of one or more target body positions that the player must assume and/or other body position related challenges. For example, the system may cause the display to display a representation of the one or more players (and/or the player's body position) and one or more body position challenge representations. For example, the displayed body position challenge representation may include a wall (or other structure), wherein the wall has at least one opening formed therein. The opening can take the form of various sizes and shapes. In some embodiments, the wall or portions of the opening of the wall may be at different heights relative to a plane such as the ground (e.g., to require the player to jump up to or duck down to the appropriate height). In one embodiment of the game, the object of the body position challenge may be for the player to assume a body position that enables the representation of the players' body to fit through the opening of the wall without contacting a portion of the wall. In this example, the videogame may cause a display of relative movement between a representation of a player (and the players body position) and the wall (or other structure) and give the player a given amount of time to assume such a body position. At the end of the time (and/or before) the system may compare the player's body position with the body position challenge to determine the degree of match (or mismatch) therebetween. As one example, the degree of match or mismatch may be determined at least in part by determining if the player's body position at the relevant time (or times) is such that the player would fit through the opening without contacting any portion of the wall and/or if there is contact, the extent of contact.

In some implementations, players may configure their own customized player representations. Customization of a player representation may include customization of a size, shape, features (e.g., hair, facial features, and/or other features), clothing, props, and/or other aspects of the representation that are customized. In such implementations, the body position challenge representations displayed to a given user may be customized to correspond to the representation of the given player. For example, if the representation of the given player has large, spiky hair, the body position challenge representations (e.g., holes in a wall) displayed to the given user may reflect this distinctive feature.

According to various implementations, objects that are grasped or otherwise engaged by a player and/or the representation of the player may play a role in the videogame. The objects may include virtual and/or real objects. A virtual object may include an object that is depicted in a display of the videogame to the player. A real object may include a physical object that is physically present with the player.

Virtual objects may be associated with the representation of the player in the videogame. For example, a virtual object may be grasped, carried on, and/or otherwise associated with the representation of the player in the display of the videogame. The virtual object may be an "positive" object, or a "negative" object.

If a virtual object that is a positive object is associated with the representation of the player (e.g., is grabbed by the representation of the player), the area and/or volume of the virtual object may be added to the area and/or volume attributed to the player and/or his representation in the game. This added volume and/or area is taken into account in assessing the conformance of the player to body position challenges. The added volume and/or area may make it more difficult, for example, for the player to conform to body position challenges that dictate a specific silhouette or profile to be assumed by the player and/or body position challenges that specify a volume for the player to assume. The association of a positive virtual object with the representation of the player may be a penalty and/or disincentive within the videogame for some behavior, may be a way of handicapping the game to enable players of different skill levels to compete with each other, and/or may enable the player to achieve higher scores for executing the same body position challenges.

If a virtual object that is a negative object is associated with the representation of the player, the area and/or volume of the object may be subtracted from the area and/or volume attributed to the player and/or his representation in the game. For example, the player may position the negative object between his representation and some reference plane, axis, point, or object (e.g., an approaching wall, a different type of approaching body position challenge representation). The portion of the area and/or volume of the player represented by the portion of the representation that is covered by the negative object may be subtracted from the area and/or volume of the player. This may make performing a body position challenge easier by selectively subtracting a portions of the player's anatomy from the comparison between the body position challenge and the body position of the player. The association of a negative virtual object with the representation of the player may be a reward and/or incentive within the videogame for some behavior and/or may be a way of handicapping the game to enable players of different skill levels to compete with each other.

Real objects are physical objects that can be engaged and manipulated physically by the player. The body position detector may provide input information to the processor that indicates information about a physical object held, carried by, and/or otherwise engaged by the player. The information may include dimensional information defining a position of the object in two dimensional or three dimensional space, a volume of the object, an area of the object, a shape of the object, and/or other aspects of the object. Similar to virtual objects, real objects may be positive objects or negative objects. Whether a real object is considered by the videogame to be a positive object or a negative object may be based on parameters of the game, a selection by the player and/or another player (e.g., an opponent, a collaborator, and/or other players), and/or otherwise determined. If a real object is considered by the videogame to be a positive object, then the volume and/or area of the real object is added to the volume and/or area of the player. If a real object is considered by the videogame to be a negative object, then the real object can be positioned between the player and some reference plane, point, axis, or object (e.g., the body position detector, the display of the videogame, and/or other objects), and the volume and/or area of the player covered by the real object is removed from the volume and/or area of the player.

Various techniques are contemplated for expressing the timing information to the one or more players. For example, timing information may be indicated via various mechanisms associated with the display. In one example, a simple timer may be displayed to visually indicate that amount of time one or more players has remaining to assume the body position. According to one embodiment, the timing information relating to by when a player must assume a body position (e.g., for scoring purposes) may be implemented by displaying on a display relative movement between a representation of the player (and/or the player's body position) and one or more reference indicator (e.g, a reference plane). For example, if the body position challenge representation includes a wall (or other structure) having at least one opening formed therein, the reference plane may be a plane associated with the wall (or other structure). For example, the reference plane may be at or in relatively close proximity to the wall. In this way, the game can depict a representation of the player attempting to pass through the wall and determine whether the player has successfully done so without contacting the wall. Other timing indicators can be used.

The length of the timing intervals associated with the different walls may be controlled by the distance between the walls along the path and/or the rate at which the walls move along the path.

At a given time or over a given time interval, the videogame system may compare body position parameters of the one or more player's detected body position(s) to body position parameters dictated by the body position challenge to determine a degree of match or mismatch based on various criteria. For example, if the body position challenge relates to a specific silhouette or profile, the silhouette of the player (e.g., as detected by the body position detector) may be compared with the silhouette dictated by the body position challenge. In some implementations, the body position challenge may relate to a volume with a specific three-dimensional shape and the three-dimensional shape of the players body position may be compared to this three-dimensional shape. In some implementations, the body position challenge may relate to relative positions of body parts (e.g., left foot in front of right foot). In some implementations, the body position challenge may relate to other parameters, such as for example, body orientation, location of the body, and/or specific parts thereof, motion of the body, gestures, and/or other parameters. In such implementations, the corresponding parameters of the player's body position may be determined (e.g., by the body position detector) and may be compared with the parameters of the body position challenge to determine the degree of match or mismatch.

Based on the results of the comparison and/or other criteria, the game may generate a score or other feedback for display or other output. For example, the system may determine a score based at least on the degree of match or mismatch between one or more body position parameters of the players detected body position at a given time (or over an interval) and the body position parameters of the body position challenge associated with that time or time interval according to various scoring criteria. For example, in the case of the wall with an opening, if the body position challenge requires avoiding contact with the wall, one of the scoring criteria may be whether the outline of the player's body position at a given time would avoid contact with the wall. As another example, even if there is some contact, another criteria may be the degree of contact. In the event the body position challenge involves maximizing contact with a wall, one scoring criteria may include whether the player's body position at a given would make contact with the wall. As another example, if there is some contact, another criteria may be the degree of contact. As another example, a body position challenge may involve not contacting a wall, but minimizing the amount (e.g., area) of an opening that is not filled by the representation of the player's body at a given time. In this case the scoring criteria may include points for not contacting the wall, deductions for unfilled areas and/or deductions for some areas of contact.

As another example, the scoring criteria may include how far in advance and/or for how long the player maintained a body position with body position parameters that satisfy the body position challenge (as detailed below). Other scoring criteria and body position challenges may be used, some of which are disclosed below.

The scores and/or other feedback may be output for display (or other output). The feedback may include visual feedback, audio feedback, and/or other feedback. Such feedback may provide the player with information regarding the quality of his or her conformance to a target body position at, after or before the expiration of a timing interval associated with the target body position. For example, based on score or real-time display/determination prior to expiration.

In implementations in which body position challenges relate to a player assuming a body position having an outline or silhouette that fits through openings in walls at given times, the videogame may present a preview of the player's body position relative to the wall, prior to the expiration of the given time interval, to provide guidance to the user. As one example, the videogame may cause the display to display a first representation of the player and a second representation of the player. The first representation of the player may be depicted at a distance from the wall to help indicate the amount of remaining time until the expiration of that time interval. The second representation may depict a superposition of the representation of the player on a reference plane (e.g., a reference plane of the wall). The superposition can depict a representation of whether the player's current body position would cause or avoid contact with the opening of the wall and/or the degree of contact therewith and/or the area of the opening filled or not filled.

As another example, instead of depicting a second representation of the player at the reference plane, the videogame may determine, prior to expiration of the given time interval, whether the player's current body position would cause or avoid contact with the opening of the wall and/or the degree of contact therewith and/or the portions of the opening filled or not filled and provide one or more visual (or other) indicators relating thereto. If there would not be any contact, the display can display a visual or other indicator for indicating that there would not be contact.

As another example, the display may use a first visual indicator (e.g., a first highlight color) to indicate (e.g., highlight) portions of the wall where the player's current body position would cause contact with the wall. The display may use a second visual indicator (e.g., a second highlight color) to indicate (e.g., highlight) portions of the opening filled or not filled based on the player's current body position.

As another example, the videogame may cause the display to display one or more visual (or other) indicators indicating whether the representation of the player that would contact the wall and/or which portions of the representation of the player would contact the wall. For instance, these indicators may include highlighting portions of the representation of the player that would contact the wall.

Other forms of feedback can include text, audible feedback, haptic feedback among other forms of feedback.

According to other aspects of the invention, the videogame may reward and/or penalize the player (e.g., through scoring) for activities other than merely conforming to a body position challenges at or over a given time.

For example, the videogame may provide an incentive to the player (e.g., through scoring or some other mechanism) for positioning his body such that the avatar conforms to an upcoming body position challenge in advance of the expiration of the corresponding timing interval, and then holding that position until the timing interval passes. The magnitude of the incentive may be based, at least in part, on the length of time prior to the expiration of the timing interval that the avatar was in the appropriate position. As another example, the videogame may provide an incentive to the player (e.g., through scoring or some other mechanism) for holding a body position after a timing interval has expired. The magnitude of the incentive may be based, at least in part, on the length of time after the timing interval has expired that the body position is maintained.

Various alternatives, additions and/or enhancements to the basic aspects of the videogame described above may by included. For example, the videogame may involve displaying a succession of body position challenges for one or more players. For example, the videogame may display a series of walls (or other structures), each capable of having openings of different shapes and sizes corresponding to different target body positions. To the extent that the game displays relative movement between a representation of the one or more players and the body position challenges (e.g., walls), the timing information between the body position challenges may be fixed or variable. For example, for a given game or game segment, the relative time between successive walls may be fixed (e.g., a constant time) so that the player as the same amount of time to assume a target body position or may vary between being relatively faster and relatively slower to give the player more or less time to assume the target body position.

According to another aspect of the invention, the relative movement between a challenge object and a representation of a player may move along a path. The path may be substantially linear (e.g., generally perpendicular to a plane of a wall). In some implementations, the path may be, or include segments that are, substantially straight and or curved.

For example, the walls (or other structures) may rotate, relative to the representation of the one or more players, about an axis of rotation or vice versa. For example, if a surface rotates relative to the representation of the player, the player may appear to be in a relatively fixed location and the walls rotate about that position. In such cases, the timing information may relate to when a leading surface of the wall is at or in proximity to the players position. In such implementations, the length of the timing intervals associated with the different walls may be controlled by the spacing of the walls on the rotating surface, the radial distance from the axis of rotation to the avatar(s), and/or the rotational velocity of the surface.

In some implementations where the body position challenge representations are walls having openings, the path (or at least a portion thereof) of motion between the representation of the player and the walls may not be perpendicular with a plane of the walls. For example, there may be relative lateral movement between the wall and the representation of the player. This may require the player to both move laterally to a corresponding location and assume a target position. In this scenario, the body position detector (and/or other detectors) may detect the player's relative location and other body position parameters (e.g., silhouette or outline). In this case, even if a player assumes a body position having an outline or silhouette that corresponds to an opening in an approaching wall, the relative lateral position of the player may cause undesired contact with the wall.

In some implementations, the body position challenges may include challenges that are represented to players as obstacles and/or pick-ups. The obstacles and/or pick-ups may be displayed as moving around the display relative to the representation of the player. By moving his body, the player may be able to control his representation to either avoid (for obstacles) and/or make contact with (for pick-ups) the moving obstacles and/or pick-ups. The obstacles and/or pick-ups may be presented such that the player must control his representation to either avoid or make contact with them in addition to positioning the his representation in accordance with other body position challenges (e.g., walls having openings). For example, the player may have to move a hand, foot or other body part to a designated portion of the display at or near a given time to make contact with a pick-up or to avoid contact with an obstacle. A pick-up may identify a body part of the avatar that must contact the pick-up in order to gain the incentive associated with the pick-up, or to maximize the incentive associated with the pick-up.

In some implementations, the videogame may involve presenting the player with a plurality of body position challenge representations representing a plurality of body position challenges that correspond to a single time or timing interval. The player may select a single body position challenge to attempt. The player may select a body position challenge with a physical gesture (e.g., pointing to one body position challenge representation), by simply attempting a selected body position challenge, and/or through other selection mechanisms. The videogame may involve incentivizing selections of more difficult body position challenges. An incentive may be in the form of one or more of an increase in score, a score bonus, a timing bonus, an increased allowance for error in conforming to the target body positions, manna or life force awards, and/or other incentives.

According to various implementations, the videogame may be played as a single player game. In the single player game, the player is the sole individual playing the game. In the single player game, the player may compete (e.g., through performing body position challenges) with a previous score, to complete "levels," to unlock new game content, and/or for other purposes. In some implementations, one or more of the multi-player game modes described below may also be played as a single player mode wherein the other players are controlled by artificial intelligence. For example, the competitive multi-player modes and/or the cooperative multi-player modes described below may be played by a single player with and/or against players that are controlled by artificial intelligence.

According to various implementations, the videogame may be played as a multi-player game by two or more players. In the multi-player game, the two or more players participating in the videogame may be present in the same physical location, or in disparate physical locations. When the two or more players are present in the same physical location, dimensional information defining the positions of their bodies and/or body parts may be captured by the same body position detector to be processed as inputs to the videogame.

When the two or more players are participating from separate physical locations, each player may participate via a separate body position detector, display, and processor system that are linked by a network.

In the multi-player game, a plurality of players may compete against each other and/or work collaboratively in one or more multi-player modes. For instance, two or more players may compete against each other in a competitive multi-layer mode. In this mode, representations of the two or more players may be displayed simultaneously with separate sets of body position challenge representations (e.g., in the form of walls with openings) for each of the players. The timing intervals associated with the separate sets of body position challenges may be synchronized (e.g., so that the players attempt challenges at the same time) and/or the timing intervals may be offset (e.g., so that the players attempt the challenges in a staggered manner).

In some implementations, each of the separate sets of body position challenges includes the same body position challenges in the same order. In such implementations, the players must attempt the same body position challenges either simultaneously, or in succession (e.g., a follow-the-leader type of timing). In some implementations, each of the separate sets of body position challenges includes different body position challenges.

In order to facilitate competition between players of disparate skill levels, the competitive multi-player mode may include one or more handicapping features. For example, different sets of body position challenges may be presented to the players, with the differences between the body position challenges being provided so that a more skilled player is presented with a harder set of body positions. Handicapping players of different skill levels may include adjusting the timing intervals (e.g., shorter timing intervals for more skilled players). In some implementations, handicapping may include requiring a more skilled player to hold body positions corresponding to the body position challenges for a more prolonged period of time to gain the same incentives as a less skilled player receives for holding body positions for a shorter period of time. Other handicapping features may be incorporated into the videogame.

In some implementations of the competitive multi-player mode, the videogame may enable one of the players to have some control over the body position challenges presented to one or more of the other players. This may enable the controlling player to control the difficulty of body position challenges presented to the other player. Control over the difficulty of the body position challenges presented to another player may include one or more of control of timing intervals associated with the body position challenges, selection of specific body position challenges, selection of body position parameters of body position challenges, and/or control over other aspects of the body position challenges. This may present an aspect of risk-reward to the player, as the posing player will be less-likely to conform completely to body position challenges when difficulty is increased, but increased difficulty may have a higher scoring potential for the posing player. Control by a player over the difficulty experienced by a posing player within the videogame may be accomplished via a peripheral control device and/or via gestures that are detected by the body position detector and/or the processor(s).

According to various implementations, the multi-player game may include a competitive multiplayer mode in which one or more players follow the body position of a leading player (e.g., a follow-the-leader mode). In this mode, the leading player may set one or more parameters (e.g., body positions parameter(s)) of a body position challenge for the following player(s) by positioning himself with the desired one or more parameters at predetermined intervals. The following player(s) must then conform themselves to body position challenges having the one or more parameters dictated by the body position of the leading player. For example, in some implementations, a series of blank walls may approach a representation associated with the leading player. As a blank wall reaches the representation, an opening may be created in the wall that corresponds to one or more parameters of the body position of the representation of the leading player. The wall with the newly created opening may then approach a representation of the following player. The following player then tries to achieve a body position such that the representation of the following player conforms to the newly created opening at the point in time when the wall reaches the representation of the following player.

According to various implementations, the videogame may include a cooperative multi-player mode in which two or more players cooperate to position themselves in response to compound body position challenges. Compound body position challenge representations of the compound body position challenges may be presented to the two or more players, for example, using a technique similar to the ones described above for the presentation of body position representations for individual players. As was mentioned above, the two or more players may be present in the same physical location, or may be in disparate physical locations. If the two or more players are participating from separate physical locations, the players may each be presented with a display that includes representations associated with all of the cooperating players. By changing his body position, a player may control his representations to fall into the appropriate position with respect to the other presented player representations so that the presented representations, as a whole, conform to the presented compound body position representation.

In the cooperative multi-player mode, all of the players may be considered positive objects. In some instances, one or more of the player may be considered a negative object. In such instances, a player that is a negative object may move and/or position his body such that his representation is between the representation of another player and some reference plane, axis, point, or object (e.g., an approaching body position challenge representation). Portions of the other player represented by the portions of the representation of the other player that are covered by the representation of the player that is a negative object may be removed from the volume and/or are of the other player in analysis of the conformance of the players to cooperative body position challenges.

In some implementations, the videogame may include a studio mode in which players create body position challenges and/or sequences of body position challenges for use during game play modes such as the single player mode and/or the multi-player modes described above. A player may create a body position challenge by positioning his body in a body position and capturing parameters of the body position using the body position detector, through manipulation of a peripheral controller to dictate body position parameters, and/or by some combination of these two possibilities. The player may assemble a set of body position challenges into a sequence that can then be presented during game play modes such as the single player mode and/or the multi-player modes described above. In some implementations, the player may share created body position challenges and/or sequences of body position challenges with other players (e.g., over a network).

According to various implementations, the videogame may include an instructional mode. In the instructional mode, a player may be instructed on how to satisfy various body position challenges. During this mode, the timing intervals associated with individual body position challenges may be increased, or even done away with altogether. In the instructional mode, rather than merely presenting a body position representation (e.g., the form of a opening in the wall), the one or more processors executing the videogame may generate a display that includes additional information instructing the player on how to satisfy the body position challenge. For example, the display may show a picture or diagram of a person with a body position that satisfies the parameters of the body position challenge, a written description of how body members should be positioned to satisfy the parameters of the body position challenge, and/or other information.

In some implementations, in addition to presenting body position challenge representations to the player(s), the videogame may require or incent the performance of other actions. For example, the videogame may require the vocal performance of a piece of music, the manipulation of a musical instrument, a musical instrument-like game controller, and/or other types of controllers, the rhythmic contacting of one or more contact sensors, and/or other the performance of other actions with the conformance to body position challenges. These actions may be performed simultaneously with conformance to body position challenges and/or in separate time periods from conformance with body position challenges (e.g., first satisfy a set of body position challenges, then perform a karaoke part).

These and other objects, features, and characteristics of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

FIG. 3 illustrates a body position challenge representation, according to one or more implementations of the invention.

FIG. 4 illustrates a body position challenge representation, according to one or more implementations of the invention.

FIG. 5 illustrates a body position challenge representation, according to one or more implementations of the invention.

FIG. 6 illustrates a body position challenge representation, according to one or more implementations of the invention.

DETAILED DESCRIPTION

Figure 1:
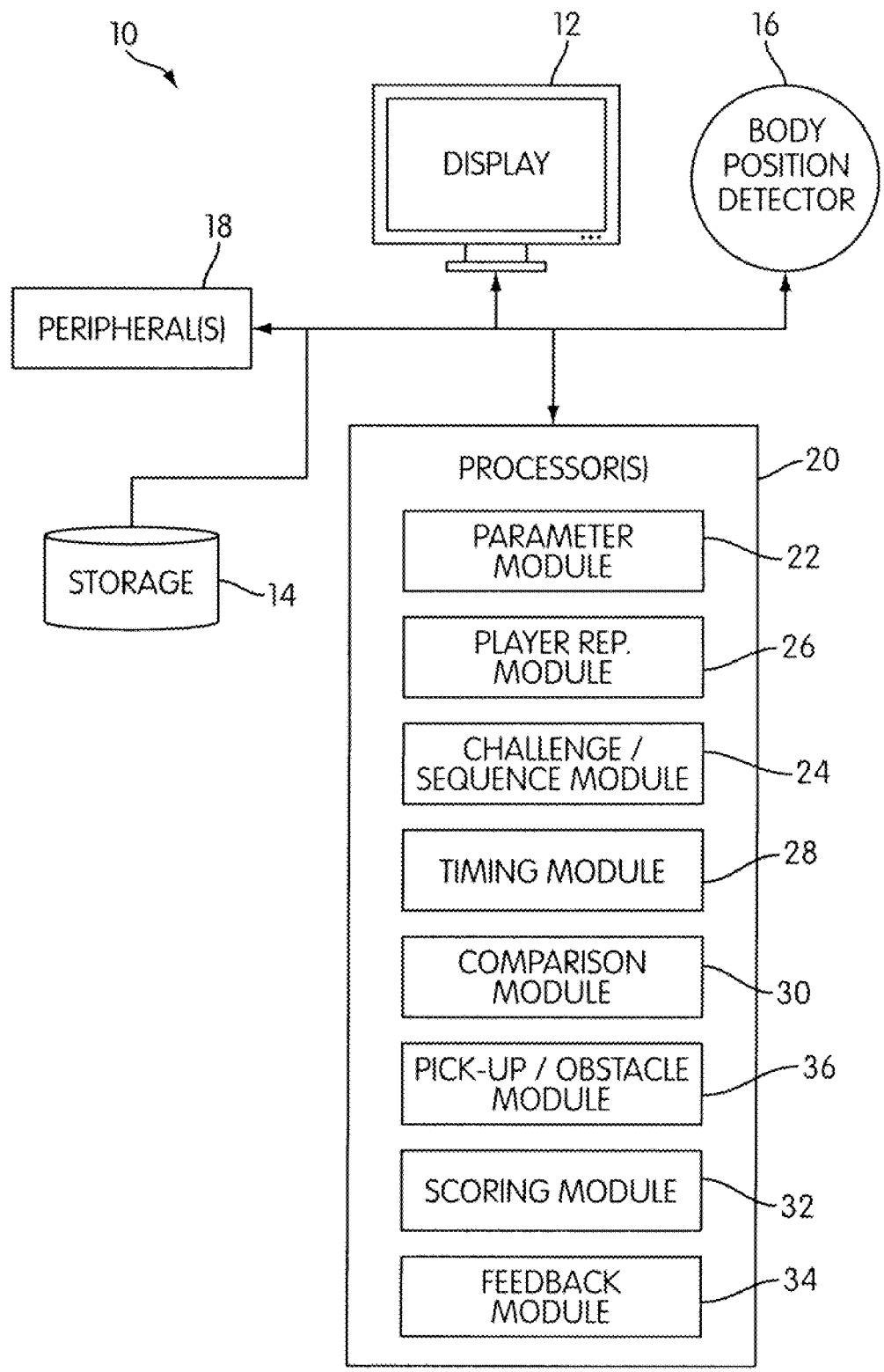
FIG. 1 illustrates a videogame system, in accordance with one or more implementations of the invention.

FIG. 1 illustrates a videogame system 10 according to one or more implementations of the invention. According to one embodiment, the videogame provided by videogame system 10 may include providing body position challenges to one or more players to assume various target body positions at, or within, a predetermined times. Body position challenges may be provided to the one or more players by displaying body position challenge representations that prompt the one or more players to assume body positions and/or execute one or more body movements or gestures corresponding to the body position challenges. The time may be indicated via various mechanisms (as detailed below). At a given time or over a given time interval, videogame system 10 may compare the player's detected body position(s) and/or movement(s) to the body position challenges to determine a degree of match or mismatch based on various criteria. Based on the results of the comparison, the game may generate a score or other feedback for display (or other forms of output). In some implementations, videogame system 10 may include one or more of a display 12, electronic storage 14, a body position detector 16, one or more peripherals 18, a processor 20, and/or other components.

Display 12 may include one or more electronic display devices that can be controlled to present visual displays to one or more players. For example, display 12 may include a television, a monitor, a handheld electronic display and/or other display devices. In some instances, display 12 may be included in, or under the control of, a common system with one or more other devices configured to provide sensory stimulation to a player. For example, the one or more other devices may include one or more speakers, one or more lights, one or more dials, one or more haptic devices, and/or other devices that provide sensor stimulation to the player including auditory stimulation, visual stimulation, tactile stimulation, and/or other sensory stimulation.

In some implementations, electronic storage 14 may comprise electronic storage media that electronically stores information. The electronically storage media of electronic storage 14 may include one or both of system storage that is provided integrally (i.e., substantially non-removable) with videogame system 10 and/or removable storage that is removably connectable to videogame system 10 via, for example, a port (e.g., a USB port, a firewire port, etc.) or a drive (e.g., a disk drive, etc.). Electronic storage 14 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 14 may store software algorithms, information determined by processor 20, and/or other information that enables videogame system 10 to function properly. Electronic storage 14 may include one or more separate components within videogame system 10. Electronic storage 14 may include one or more components provided integrally with one or more other components of videogame system 10 (e.g., processor 10).

Body position detector 16 may be configured to be operable to detect one or more parameters that define the position of the body (and/or body parts) of a player in space. By way of non-limiting example, body position detector 16 may be configured to capture two and/or three dimensional information defining the position of the bodies and/or body parts of a player in two dimensional or three dimensional space. The two and/or three dimensional information may include, for example, one or more images of the player captured sequentially and/or simultaneously (e.g., from different viewpoints), a map of the positions of the body and/or body parts of the player in a two dimensional space, a map of the positions of the bodies and/or body parts of the player in a three dimensional space, and/or other dimensional information. From the captured dimensional information, one or more body position parameters of the bodies of the player may be detected. The one or more body position parameters may include the relative positions of two or more of the parts of the body of the player, a profile and/or silhouette of the player, a volume of the player, and/or other body position parameters. The relative positions of two or more of the parts of the body of the player may include, for example, the positions of the two or more of the head, torso, legs (individually), arms (individually), feet (individually), and/or hands (individually) relative to each other.

From the two and/or three dimensional information captured by body position detector 16, parameters other than the one or more body position parameters may be determined. The one or more other parameters may include depth information that represents the distance of the player from a real or virtual reference plane (as detailed below), information related to pose (e.g., the maintenance of the relative positions of the body parts of the player), information related to gesture (e.g., coordinated movement of one or more body portions), information related to location (e.g., within a room, with respect to the ground, and/or other location information), information related to directional orientation, information related to motion (e.g., speed, inertia, acceleration, rhythm, and/or other information), information related to size, information related to volume, and/or other information. For example, some aspects of the game may require the player to move laterally, perform one or more gestures, and/or hold one or more poses.

To enable the videogame to be played by more than one person, more than one body position detector 16 may be used and/or a single body position detector 16 may be capable of simultaneously discerning between and detecting parameters for two or more players (as detailed below).

Peripherals 18 may include one or more devices configured to operate in coordination with the other components of videogame system 10 to provide the videogame to one or more players. For example, peripherals 18 may include one or more of the sensory stimulation devices discussed above with respect to display 12. Peripherals 18 may include one or more input devices configured to enable a user to input information to videogame system 10. Examples of the one or more input devices may include a keypad, buttons, switches, a keyboard, knobs, levers, a touch screen, a microphone, a joystick, a direction-pad, and/or other input devices.

Processor 20 may be configured to provide information processing capabilities in videogame system 10. As such, processor 20 may include one or more of a digital processor, an analog processor, a digital circuit designed to process information, an analog circuit designed to process information, a state machine, and/or other mechanisms for electronically processing information. Although processor 20 is shown in FIG. 1 as a single entity, this is for illustrative purposes only. In some implementations, processor 20 may include a plurality of processing units. These processing units may be physically located within the same device, or processor 20 may represent processing functionality of a plurality of devices operating in coordination. For example, in some implementations, some of the functionality attributed to processor 20 may be provided by processing capabilities provided integrally with body position detector 16, while other functionality attributed to processor 20 may be provided by one or more processing units physically located in a console or terminal that is separate from body position detector 16.

As is shown in FIG. 1, in one embodiment, processor 20 executes one or more modules including a parameter module 22, a challenge/sequence module 24, a player representation module 26, a timing module 28, a comparison module 30, a scoring module 32, a feedback module 34, a pick-up/obstacle module 36, and/or other modules. Modules 22, 24, 26, 28, 30, 32, 34, and/or 36 may be implemented in software; hardware; firmware; some combination of software, hardware, and/or firmware; and/or otherwise implemented. It should be appreciated that although modules 22, 24, 26, 28, 30, 32, 34, and/or 36 are illustrated in FIG. 1 as being co-located within a single processing unit, in implementations in which processor 14 includes multiple processing units, modules 22, 24, 26, 28, 30, 32, 34, and/or 36 may be located remotely from the other modules. Further, the description of the functionality provided by the different modules 22, 24, 26, 28, 30, 32, 34, and/or 36 described below is for illustrative purposes, and is not intended to be limiting, as any of modules 22, 24, 26, 28, 30, 32, 34, and/or 36 may provide more or less functionality than is described. For example, one or more of modules 22, 24, 26, 28, 30, 32, 34, and/or 36 may be eliminated, and some or all of its functionality may be provided by other ones of modules 22, 24, 26, 28, 30, 32, 34, and/or 36. As another example, processor 14 may include one or more additional modules that may perform some or all of the functionality attributed below to one of modules 22, 24, 26, 28, 30, 32, 34, and/or 36.

It will be appreciated from the foregoing that in some implementations videogame system 10 may be achieved on various videogame platforms. However, this is not intended to be limiting, as videogame system 10 may be implemented in a variety of different contexts.

Parameter module 22 may be configured to obtain player parameters body position parameters, and/or other parameters of one or more players playing the videogame. The parameters may include parameters obtained directly from body position detector 16 and/or parameters determined by parameter module 22 based on information obtained from body position detector 16, information input to videogame system 10 by players (e.g., via peripherals 18), information stored by electronic storage 14, and/or other information. The player parameters obtained by parameter module 22 may include one or more of a number of players, identifications of individual players, identified body parts of individual players, information related to pose, and/or other player parameters. The body position parameters obtained by parameter module 22 for a given player may include one or more of a profile/silhouette parameter, a parameter describing the relative position of two or more body parts (e.g., head, torso, legs, arms, hands, feet, and/or other body parts), a volume or area parameter, and/or other body position parameters. Other parameters determined by parameter module 22 may include one or more of a depth parameter related to the distance of the player from a real or virtual reference plane, a body pose parameter (e.g., parameterizing the pose of a player), a gesture parameter, a location parameter, an orientation parameter, a motion parameter, a rhythm parameter, a timing parameter, a size parameter, and/or other parameters.

According to various implementations, one or more body position parameters determined by parameter module 22 may be impacted by objects that are grasped or otherwise engaged by a player and/or the representation of the player in the videogame. The objects may include virtual and/or real objects. A virtual object may include an object that is depicted in a display of the videogame to the player. A real object may include a physical object that is physically present with the player.

Virtual objects may be associated with the representation of the player in the videogame. For example, a virtual object may be grasped, carried on, and/or otherwise associated with the representation of the player in the display of the videogame. The virtual object may be an "positive" object, or a "negative" object.

If a virtual object that is a positive object is associated with the representation of the player (e.g., is grabbed by the representation of the player), body position parameters of the user, such as the area and/or volume of the user, may be determined as if the positive object were a part of the player's body. Thus, determinations by parameter module 22 of, for example, the area and/or volume of the player may be increased by the of the virtual object.

As will be appreciated, performing body position challenges while being associated with a positive object may increase the difficulty of the body position challenges. The association of a positive virtual object with the representation of the player may be a penalty and/or disincentive within the videogame for some behavior, may be a way of handicapping the game to enable players of different skill levels to compete with each other, and/or may enable the player to achieve higher scores for executing the same body position challenges.

If a virtual object that is a negative object is associated with the representation of the player, parameter module 22 may determine body position parameters of the player as if the object cancels out a portion of the volume and/or area of the player. The portion of the volume and/or area of the player that are canceled out by the negative virtual object may correspond to a portion of the representation of the player that is "covered" by the virtual object.

Figure 2A:
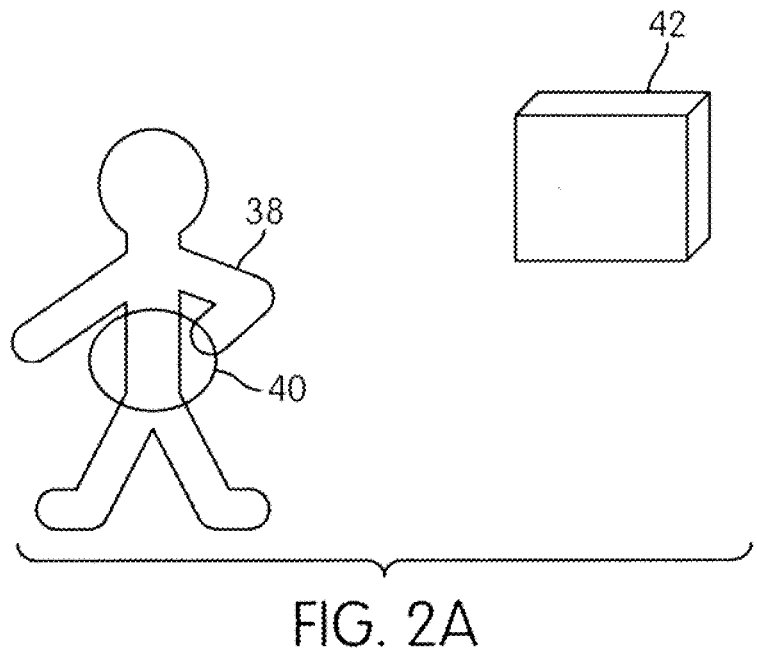
FIG. 2 illustrates one aspect of negative objects, in accordance with one or more implementations of the invention.
Figure 2B:
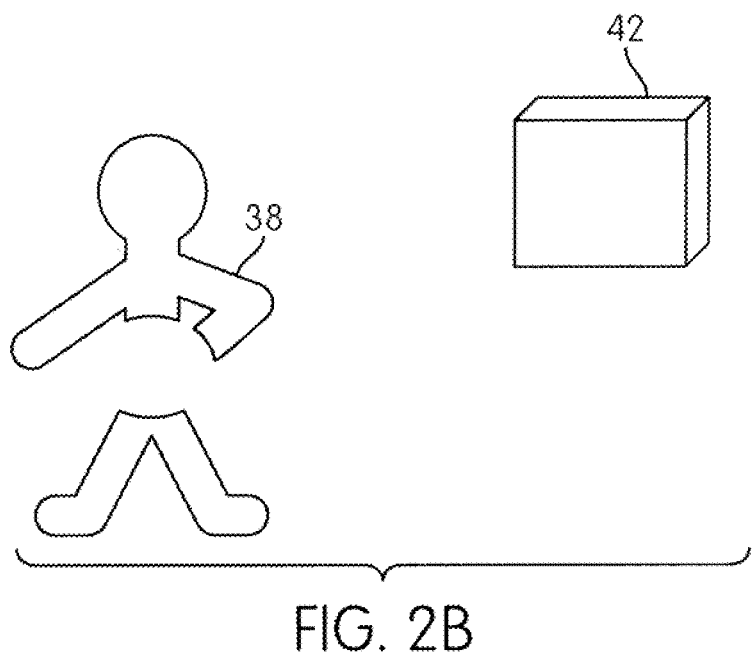

By way of example, FIG. 2A illustrates a representation 38 of a player associated with an object 40. Object 40 may be positioned between representation 38 and some reference object 42. FIG. 2B illustrates representation 38 of the player, minus the portion of the area and/or volume of the player that has been subtracted from the player by virtue of the presence of reference object 42 between representation 38 and object 40. Parameter module 22 may then determine one or more body position parameters based on the area and/or volume of the player depicted by representation 38 in FIG. 2B (minus the "covered" portion of the player). Object 40 may include a reference plane, axis, point, or object (e.g., an approaching wall, a different type of approaching body position challenge representation).

The subtraction of a portion of the area and/or volume of a player based on the position of a negative object may make performing a body position challenge easier for the player. As such, the association of a negative virtual object with the representation of the player may be a reward and/or incentive within the videogame for some behavior and/or may be a way of handicapping the game to enable players of different skill levels to compete with each other.

Returning to FIG. 1, real objects are physical objects that can be engaged and manipulated physically by the player. Body position detector 16 may provide input information to processor 20 that indicates information about a physical object held, carried by, and/or otherwise engaged by the player. The information may include dimensional information, a volume of the object, an area of the object, a shape of the object, and/or other aspects of the object. Similar to virtual objects, real objects may be positive objects or negative objects. Whether a real object is considered by the videogame to be a positive object or a negative object may be based on parameters of the game, a selection by the player and/or another player (e.g., an opponent, a collaborator, and/or other players), and/or otherwise determined. If a real object is considered by the videogame to be a positive object, then the volume and/or area of the real object is added to the volume and/or area of the player by parameter module 22 for the purposes of determining one or more body position parameters and/or other parameters. If a real object is considered by the videogame to be a negative object, then the real object can be positioned between the player and some reference plane, point, axis, or object (e.g., body position detector 16, display 12, and/or other objects), and the volume and/or area of the player covered by the real object is removed from the volume and/or area of the player by parameter module 22 for the purposes of determining one or more body position parameters.

Challenge/sequence module 24 may be configured to present body position challenges and/or sequences of body position challenges to a player during play of the videogame. The body position challenges may be presented by displaying body position challenge representations to one or more players via display 12 that prompt the one or more players to assume various target body positions corresponding to the body position challenges.

A body position challenge representation may convey the target body position of a body position challenge in a variety of ways. By way of example, FIGS. 3, 4, 5, and 6 illustrate body position challenge representations 44.

The body position challenge representations 44 illustrated in FIGS. 3 and 4 may include obstacles. In order to avoid these obstacles, a player must assume a body position (and/or make a motion) that would enable the player to avoid body position challenge representations 44, if the body position challenge representations 44 were tangibly present with the player. As is discussed below, in some implementations, a representation of the player is displayed along with body position challenge representation 44, and the body position and/or motion of the representation of the player is displayed as corresponding to the detected body position and/or motion of the player. In such implementations, the representation of the player provides feedback to the player that enables the player to determine whether his body position and/or motion is sufficient to avoid body position challenge representation 44.

The body position challenge representations 44 illustrated in FIGS. 5 and 6 include representations 46 of target body positions corresponding to body position challenges. The representations 46 may be depicted as silhouettes having shapes that corresponds to the target body positions. In the implementations illustrated in FIGS. 4 and 5, body position challenge representations 44 may include a wall 48 (or other structure) having at least one opening 50 formed therein. The opening 50 can take the form of various sizes and shapes corresponding to different target body positions. In some embodiments, the wall or portions of the opening of the wall may be at different heights relative to a plane such as the ground (e.g., to require the player to jump up to or duck down to the appropriate height).

Body position challenge representations 44 like the ones depicted in FIGS. 5 and 6 may prompt a player to assume a body that corresponds to opening 50 of a displayed wall 48. As is discussed further below, in some implementations, a representation of the player is also displayed along with body position challenge representation 44, and the player attempts to assume a body position that enables the representation of the player to pass through opening 50 without contacting a portion of wall 48.

It should be appreciated that the illustration of body position challenge representations 44 in FIGS. 3-6 is not intended to be limiting. Other schemes for prompting a player to assume a target body position associated with a body position challenge are contemplated for body position challenge representations. For example, a body position challenge representation may include one or more objects the player must try to contact, a graphical depiction of one or more target body positions that the player must assume, a graphical depiction of a volume that a player must fill (or confine himself to), and/or other body position challenge representations.

Figure 7:
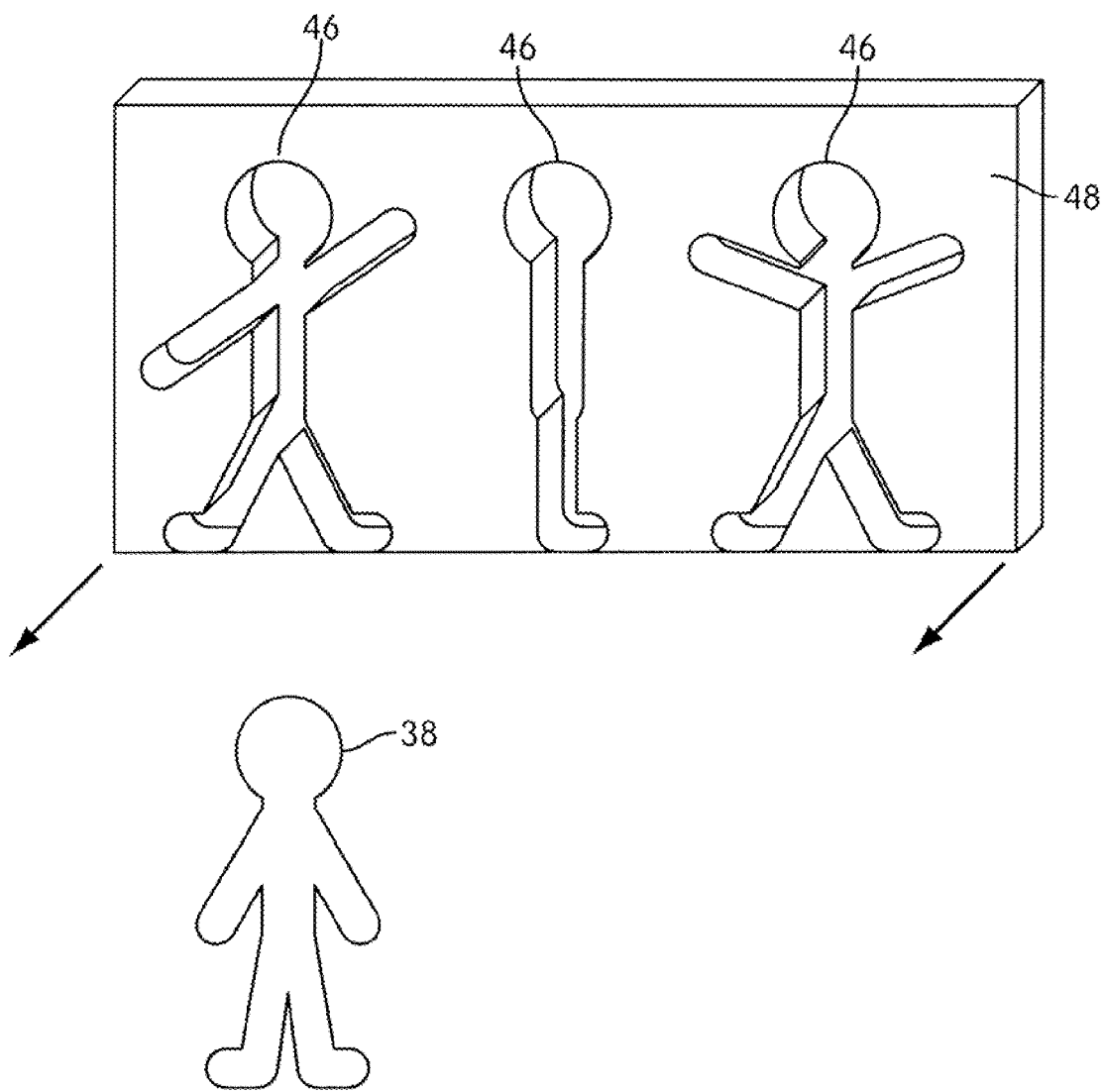
FIG. 7 illustrates a body position challenge representation, according to one or more implementations of the invention.

In some implementations, one or more body position challenge representations presented to players of the videogame may pertain to a plurality of body position challenges. For instance, FIG. 7 provides an illustration of such a body position challenge representation 38. Upon being presented with representation 38, the player may select a single body position challenge to attempt. The player may select a body position challenge with a physical gesture (e.g., pointing to one body-position challenge representation), by simply attempting a selected body position challenge, via a selection input through peripherals, by moving laterally to the selected body position challenge, and/or through other selection mechanisms. The videogame may involve incentivizing selections of more difficult body position challenges. An incentive may be in the form of one or more of an increase in score, a score bonus, a timing bonus, an increased allowance for error in conforming to the target body positions, manna or life force awards, and/or other incentives.

Returning to FIG. 1, a player representation module 26 may manage information related to player representations. Player representations may be displayed on display 12 to represent a player playing the videogame. A player representation may include an object, or set of objects. The player representation may be depicted as having a body position that corresponds to the body position of the player associated with the player representation (e.g., based on body position detected by body position detector 16).

Player representation module 26 may enable players to create customized representations. Customization of a player representation may include customization of a size, shape, features (e.g., hair, facial features, and/or other features), clothing, props, and/or other aspects of the representation that are customized. Player representation module 26 may manage associations between players that have previously established customized representations on videogame system 10 and their representations. In some instances, a customized player representation may be created in separate environment (e.g., another game, an avatar creation setting such as Nintendo's Mii Channel, Sony Home, and/or Xbox Live) and imported to videogame system 10. Importation of previously created customized player representations may be managed by player representation module 26.

In implementations where videogame system 10 enables players to be represented by customized player representations, the body position challenge representations displayed to a given user may be customized to correspond to the representation of the given player. For example, if the representation of the given player has large, spiky hair, the body position challenge representations (e.g., holes in a wall) displayed to the given user may reflect this distinctive feature.

In some implementations, players of the videogame may be prompted to perform body position challenges (e.g., to assume target body positions associated with the body position challenges) for or within a predetermined time. Player information, such as one or more body position parameters, may then be determined at a given time or over a given time interval the corresponds to a given body position challenge. The player information may then be compared to the body position challenge to determine a degree of match and/or mismatch between the actual body position of the one or more players and the target body positions. Based on this comparison the game may generate and output a score and/or other feedback for the one or more players. Other scoring and feedback criteria may also be used. In some implementations, the times and/or time intervals associated with body position challenges are managed by timing module 28. Comparisons between body position challenges and one or more body position parameters and/or other parameters of players may be managed by comparison module 30. Scoring of the players based on performance of the body position challenges may be managed by scoring module 32.

Figure 8:
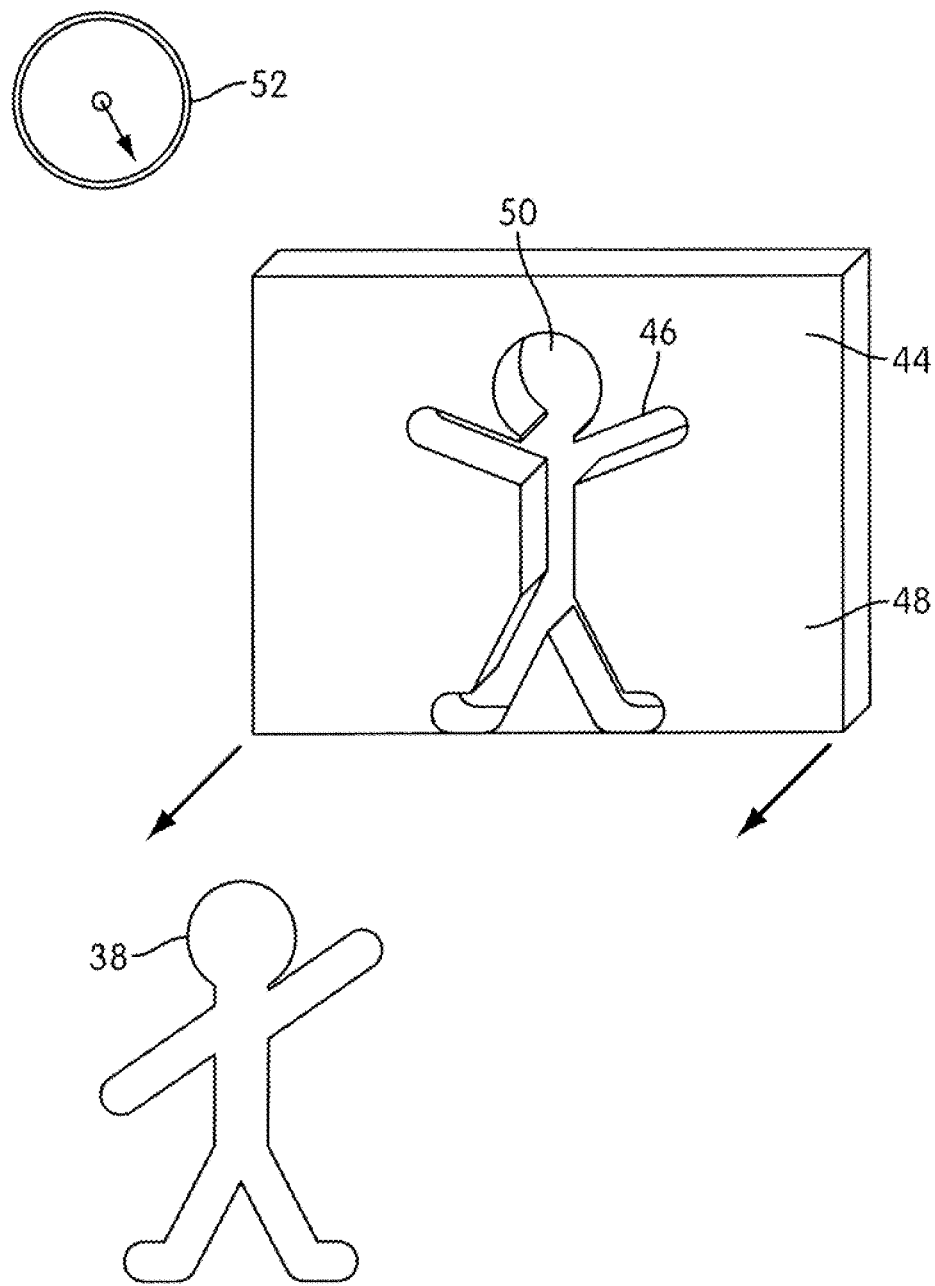
FIG. 8 illustrates a display of a videogame, in accordance with one or more implementations of the invention.

In some implementations, timing module 28 may be configured to convey to players of the videogame the times and/or time intervals associated with body position challenges. By way of illustration, FIG. 8 illustrates a presentation of a body position challenge representation 44. In the implementations illustrated in FIG. 8, timing module 28 may manage the presentation of a timing icon 52 that conveys to players a time by which a target body position corresponding to body position challenge representation 44 should be assumed and/or a target body motion should be made, a time for which the target body position and/or motion should be maintained, and/or other times or timing intervals associated with body position challenge representation 44. In some implementations, timing icon 52 may include a simple timer that visually indicates an amount of time.

In some implementations, timing information may be conveyed to players by timing module 28 by other mechanisms than timing icon 52. For example, timing information may be conveyed to players by relative movement between representation 38 of a player and a reference plane, axis, or object. The reference plane, axis, or object may include a body position challenge representation 44 (or some plane, axis, or object associated therewith). In FIG. 8, timing module 28 may convey a time by which the player represented by representation 38 should perform the body position challenge associated with body position challenge representation 44 by controlling the display of the videogame to depict representation 38 and body position challenge representation 44 moving closer and closer as time goes on. The time at which the player should perform the body position challenge may be the time at which representation 38 meets body position challenge representation 44 in the display.

In implementations in which body position challenge representation 44 includes wall 48 with an opening 50 therein corresponding to the target body position, if the player has performed the body position challenge at the appropriate time, representation 38 will assume the body target position and pass through opening 50 in wall 48. The length of the timing intervals associated with the body position challenges may be controlled by the distance between walls 48 along a path between walls 48 and representation 38, and/or the rate at which walls 48 move along the path.

In some implementations, the timing between body position challenges may be fixed or variable. For example, to the extent that the game displays relative movement between representation 38 and body position challenge representation 44, the relative time between successive body position challenge representations 44 may be fixed (e.g., a constant time) so that the player as the same amount of time to assume a target body position. Or, the timing may vary between being relatively longer and relatively shorter periods of time between body position challenge representations 44 to give the player more or less time to assume the target body position.

In some implementations, movement of the body position challenge representations 44 toward the player may be non-uniform. For example, as one of body position challenge representations 44 approaches player representation 38, body position challenge representation 44 may accelerate/decelerate and/or move from side to side in an unpredictable and/or random manner. This may provide an enhanced sense of excitement as body position challenge representation 44 approaches player representation 38 because the player corresponding to player representation 38 may not know exactly when his body position parameters will be evaluated with the body position parameters of the body position challenge (e.g., for scoring purposes).

According to various implementations, as the time corresponding to a given body position challenge approaches, the body position parameters conveyed by the body position challenge 44 corresponding to the body position challenge may fluctuate. For example, as body position challenge 44 in FIG. 8 approaches representation 38, the shape of opening 50 may change. This may prompt the player to change his body position so that the position of representation 38 conforms to the new configuration of opening 50. The amount and/or rate of change in the body parameters of the body position challenge (as represented by opening 50) may be based on a past performance of the player (e.g., increased movement as a penalty for poor performance), a skill level of the player, a game setting, and/or other parameters.

As was mentioned above, the relative movement between body position challenge representation 44 and representation 38 may include relative motion along a path between body position challenge representation 44 and representation 38. The path may be substantially linear (e.g., generally perpendicular to a plane of wall 48). In some implementations, the path may be, or include segments that are, substantially straight and or curved. For example, wall 48 (or other structures) may rotate, relative to body position challenge representation 44, about an axis of rotation that is distant from both representation 38 and body position challenge representation 44. For example, body position challenge representation 44 may be depicted as sitting on a surface that rotates relative to representation 38 while representation 38 appears to remain in a relatively fixed location. In such cases, the timing of the body position challenges presented to the player may be controlled by the spacing of body position challenge representations 44 on the rotating surface, the radial distance from the axis of rotation to representation 38, and/or the rotational velocity of the surface.

In some implementations, the path (or at least a portion thereof) of motion between representation 38 of the player and body position challenge representation 44 may not be perpendicular with a plane of wall 48. For example, there may be relative lateral movement between body position challenge representation 44 and representation 38 of the player. This may require the player to both move laterally to a corresponding location and assume a target body position to perform the body position challenge. In this scenario, body position detector 16 (and/or other detectors) may detect the player's relative location and other parameters (e.g., silhouette or outline). In this case, even if a player assumes a body position having an outline or silhouette that corresponds to an approaching body position challenge representation 44, the relative lateral position of the player may result in the detection of deficiencies in the performance of the body position challenge by the player.

In addition to depicting the time at which the target body position should be assumed, timing module 28 may control the display of body position challenge representation 44 to also convey an amount of time for which the target body position should be held. For instance, a thickness of wall 48 may be controlled to prompt the player to hold the target body position for a larger or smaller amount of time (a thicker wall prompts prolonged poses).

Referring back to FIG. 1, at the appropriate time, and/or over the appropriate time interval, comparison module 30 may be configured to compare body position parameters of the one or more players to body position parameters dictated by a body position challenge to determine a degree of match or mismatch based on various criteria. For example, if the body position challenge relates to a specific silhouette or profile, the silhouette of the player (e.g., as detected by the body position detector) may be compared with the silhouette dictated by the body position challenge. In some implementations, the body position challenge may relate to a volume with a specific three-dimensional shape and the three-dimensional shape of the players body position may be compared to this three-dimensional shape. In some implementations, the body position challenge may relate to relative positions of body parts (e.g., left foot in front of right foot). In some implementations, the body position challenge may relate to other parameters, such as body orientation, location of the body and/or specific parts thereof, and/or other parameters. In such implementations, the corresponding parameters of the player's body position may be determined (e.g., by the body position detector) and may be compared with the parameters of the body position challenge to determine the degree of match or mismatch.

Figure 9:
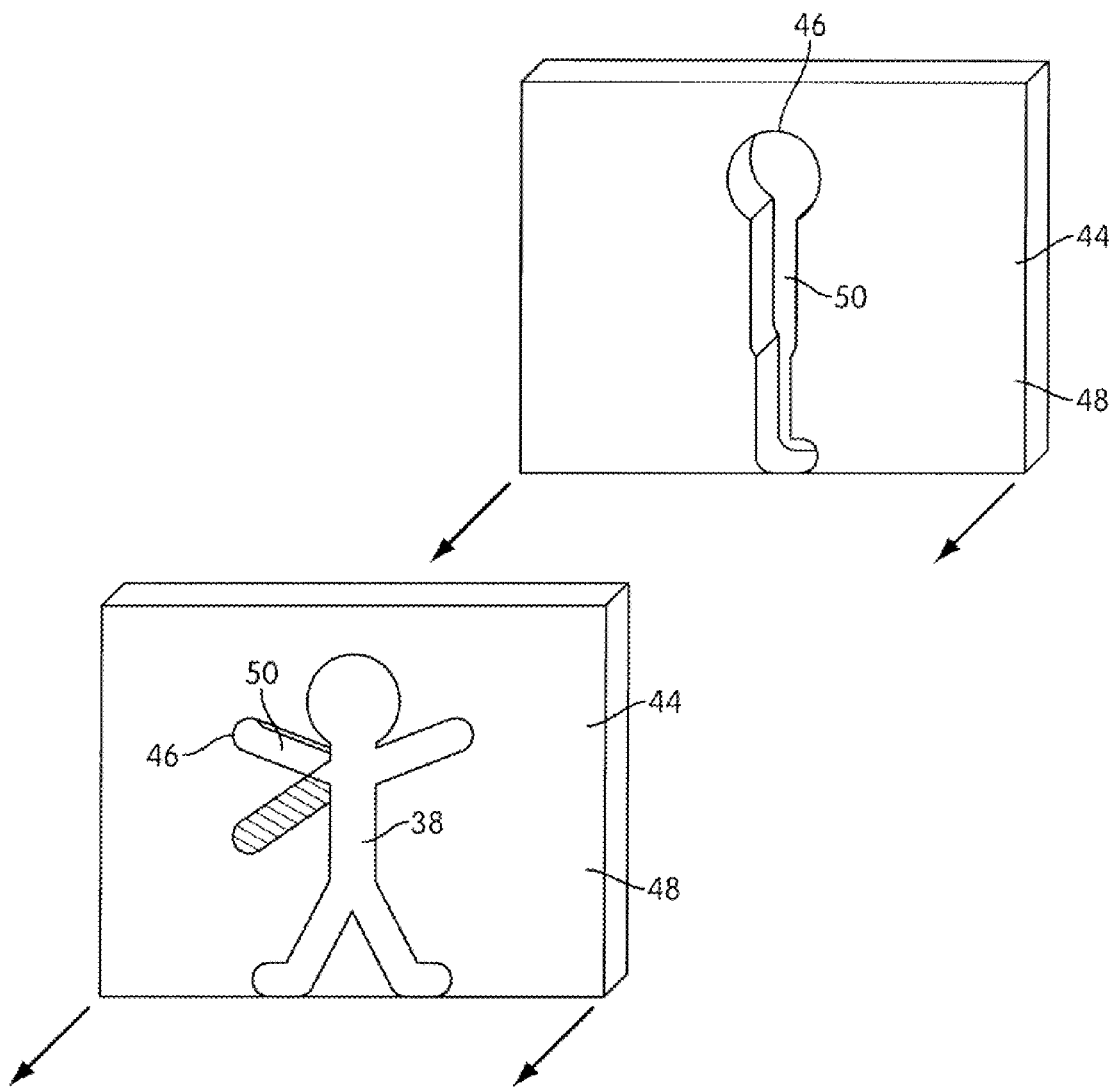
FIG. 9 illustrates a display of a videogame, in accordance with one or more implementations of the invention.

By way of illustration, FIG. 9 illustrates a display of the videogame at a point in time at which the player is being prompted to perform a body position challenge. In particular, a body position challenge representation 44 comprising wall 48 forming opening 50 has arrived at representation 38 of the player. As can be seen, representation 38 shows that for the most part the player has performed the body position challenge associated with body position challenge representation 44. However, the left arm of representation 38 does not fit into opening 50 because the corresponding part of the body of the user (e.g., the left arm) is not in the position dictated by body position challenge representation 44. Accordingly, a comparison between the body position parameters and/or other parameters of the player, and the parameters dictated by the body position challenge by comparison module 30 may reflect the mismatch illustrated in FIG. 9.

Referring back to FIG. 1, based on the results of a comparison between the body position parameters and/or other parameters of the player and the parameters of a body position challenge, and/or other criteria, scoring module 32 may generate a score for display or other output. For example, scoring module 32 may determine a score based at least on the degree of match or mismatch between the one or more body position parameters and/or other parameters of the player's detected body position and the parameters of the body position challenge, as determined by comparison module 30, according to various scoring criteria. For example, if a body position challenge is presented to a user with a body position challenge representation that includes a wall with an opening, one of the scoring criteria may be whether the outline of the player's body position at a given time would avoid contact with the wall. As another example, the criteria may be the degree of contact between the player's body position and the wall. As another example, the scoring criteria may include points for not contacting the wall, but also deductions for unfilled areas and/or deductions for some areas of contact.

In the event the body position challenge is presented to a user with a body position challenge representation that includes a wall (or other structure) to maximize contact with, one scoring criteria may include whether the player's body position at a given would make contact with the surface. As another example, the criteria may be the degree of contact.

In some implementations, the scoring criteria applied by scoring module 32 may include how far in advance and/or for how long the player maintained a body position with body position parameters and/or other parameters that satisfy the body position challenge. Other scoring criteria and body position challenges may be used, some of which are disclosed below. In some implementations, scoring module 32 may further account for other criteria in determining the scores of players. For example, scoring module 32 may take into account an amount of time for which a player holds a target body position (e.g., prior to the appropriate time, after the appropriate time passes), interactions with obstacles and/or pick-ups (as discussed below), handicapping between players of disparate skill levels, and/or other criteria.

According to various implementations, scoring module 32 may manage incentives provided to players within the game. Incentives may include rewards provided to players within the game other than simply increasing the scores awarded to players. Incentives may be provided to players as a reward for quality of performance of body position challenges, for performing pick-ups and/or avoiding obstacles (as discussed below), to handicap competing players of different skill levels, and/or for other activities within the game. Incentives may include, for example, a score bonus (e.g., future scoring multiplied and/or other score bonuses), a timing bonus (e.g., the velocity of the body position challenge representations approaching a player representation is decreased, an amount of time a target body positions must be held is decreased, spacing between body position challenge representations is increased, and/or other timing bonuses), an increased allowance for error in conforming to the target body positions (e.g., larger openings in approaching walls, a decrease in player representation size, or other allowances for error), manna or life force awards, and/or other incentives. Similarly, scoring module 32 may manage disincentives (e.g., corresponding to the incentives outlined above) for failing to perform activities within the videogame.

Feedback module 34 may manage feedback provided to players regarding their performance of body position challenges. This feedback may include feedback at and/or before the time corresponding to a body position challenge. Feedback may include information other than score that indicates to a player information about his performance of a body position challenge. Feedback presented to the player prior to a time corresponding to a body position challenge may enable the player to refine his performance of the body position challenge before his body position parameters and/or other parameters are compared with the parameters of the body position challenge. Feedback presented to the player at or after the time corresponding to the body position challenge may indicate to the player how well he performed the body position challenge. Feedback may include visual feedback (e.g., provided via display 12), audio feedback, haptic feedback, and/or other feedback.

By way of example, feedback module 34 may present a preview of the player's body position relative to a body position challenge representation (e.g., a wall) prior to the time corresponding to the body position challenge to provide guidance to the user. For example, FIG. 10 illustrates one technique that may be implemented by feedback module 34 to provide feedback to the player.

Figure 10:
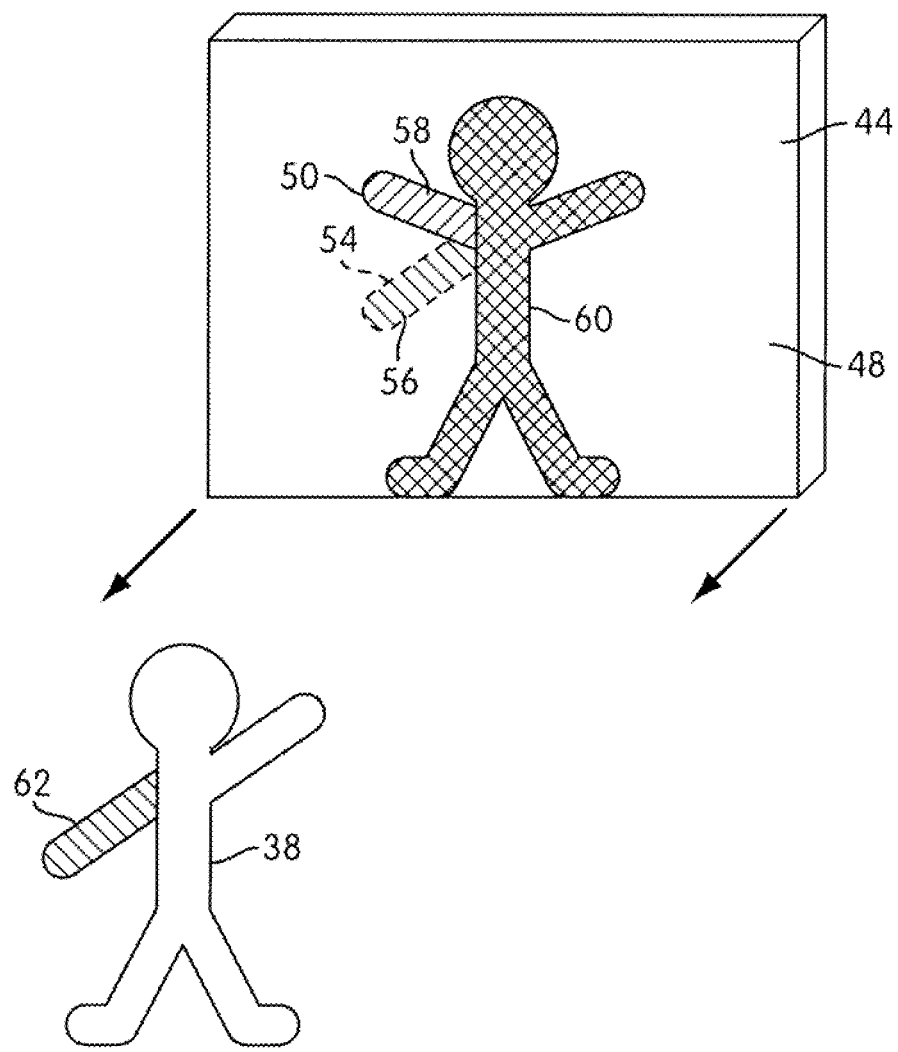
FIG. 10 illustrates the provision of one or more types of feedback to a player of a videogame, according to one or more implementations of the invention.

In FIG. 10, body position challenge representation 44 is presented to the player sin the form of wall 48 having opening 50 opening therein. Opening 50 corresponds to a target body position of a body position challenge. As time progresses toward the time at which the player will perform the body position challenge, body position challenge representation 44 progresses along a path toward representation 38. In order to provide the player with feedback prior to the time at which the player will perform the body position challenge, the display may further include a second representation 54 of the player. Second representation 54 may be superimposed on body position challenge representation 44, and may represent a current body position of the player. The superposition of second representation 54 on body position challenge representation 44 may depict, based on the player's current body position, areas 56 where representation 38 of the player would contact wall 48, areas 58 of opening 50 that would not be filled by representation 38, and/or areas 60 of opening 50 and representation 38 that currently correspond.

Referring back to FIG. 1, as another example of feedback provided by feedback module 34, instead of depicting a second representation of the player on or near a body position challenge representation feedback module 34 may determine, prior to a time associated with a given body position challenge, portions of the representation of the player and/or portions of the body position challenge representation that do not coincide, and may highlight these sections on the representation of the player (element 62 in FIG. 10) and/or the body position challenge representation. If there would not be any contact, the display can display a visual or other indicator for indicating that there would not be contact.

As was mentioned above, feedback module 34 may provide feedback to a player regarding performance of a previous body position challenge (other than score). This feedback may include, for example, audio or visual messages that convey the quality of the performance of the player. For example, if the player receives a score at or above a predetermined threshold, an audio and/or visual message may indicate such to the player. Conversely, if the player receives a score below the predetermined threshold, an audio and/or visual message may be delivered to the player that provides encouragement, derides the poor quality of performance, and/or otherwise conveys to the user that the quality of the performance was sub-par.

In some implementations, the feedback provided by feedback module 34 may include interactions between a representation of the player and the body position challenge representation. For example, in implementations in which the body position challenge representation includes a wall having an opening formed therein, failure of the player to conform his body position in accordance with the body position challenge may result in a collision between the wall and the representation of the player. This collision may have an adverse impact on the representation of the player (e.g., knock the representation down, reduce responsiveness of the representation for some time, move the representation backward, and/or other impacts).

Other forms of feedback can include text, audible feedback, and/or haptic feedback among other forms of feedback.

In some implementations, pick-up/obstacle module 36 may present challenges to players that are represented to players as obstacles and/or pick-ups. The obstacles and/or pick-ups may be displayed as moving around display 12 relative to the representation of the player and/or body position challenge representations. By moving his body, the player may be able to control his representation to either avoid (for obstacles) and/or make contact with (for pick-ups) the moving obstacles and/or pick-ups. The obstacles and/or pick-ups may be presented such that the player must control his representation to either avoid or make contact with them in addition to positioning the his representation in accordance with other body position challenges (e.g., walls having openings). For example, the player may have to move a hand, foot or other body part to a designated portion of the display at or near a given time to make contact with a pick-up or to avoid contact with an obstacle. A pick-up may identify a body part of the avatar that must contact the pick-up in order to gain the incentive associated with the pick-up, or to maximize the incentive associated with the pick-up.

According to various implementations, the videogame provided by videogame system 10 may be played as a single player game. In the single player game, the player is the sole individual playing the game. In the single player game, the player may compete (e.g., through performing body position challenges) with a previous score, to complete "levels," to unlock new game content, and/or for other purposes.

According to various implementations, the videogame may be played as a multi-player game by two or more players. In the multi-player game, the two or more players participating in the videogame may be present in the same physical location, or in disparate physical locations (e.g., over a network). When the two or more players are present in the same physical location, parameters of their body position may be captured by the same body position detector to be processed as inputs to the videogame.

Figure 11:
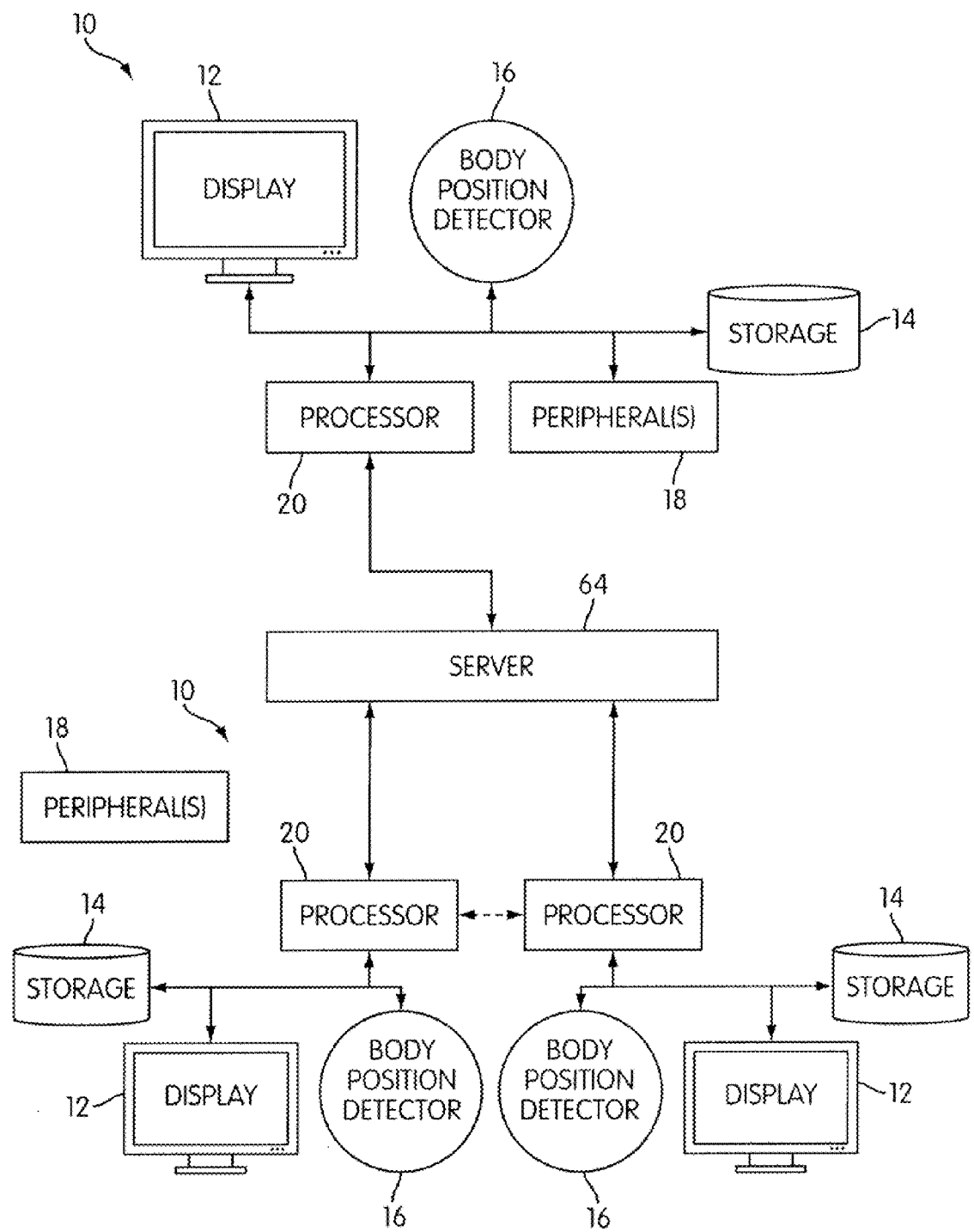
FIG. 11 illustrates a videogame system, according to one or more implementations of the invention.

If the two or more players are participating from separate physical locations, each player may participate via a separate body position detector, display, and processor system that are linked by a network. For example, FIG. 11 illustrates implementations in which separate systems similar to videogame system 10 (shown in FIG. 1 and described above) are provided for different users. In some implementations, to enable the systems to communicate with each other, processors 20 may communicate with a server 64 that manages the transmission of game information between the systems. In some implementations, processors 20 may communicate in a peer-to-peer manner without an intervening server.

In the multi-player game, a plurality of players may compete against each other and/or work collaboratively in one or more multi-player modes. For instance, two or more players may compete against each other in a competitive multi-layer mode. In this mode, representations of the two or more players may be displayed simultaneously with separate sets of body position challenge representations (e.g., in the form of walls with openings) for each of the players. The timing intervals associated with the separate sets of body position challenges may be synchronized (e.g., so that the players attempt challenges at the same time) and/or the timing intervals may be offset (e.g., so that the players attempt the challenges in a staggered manner).

Figure 12:
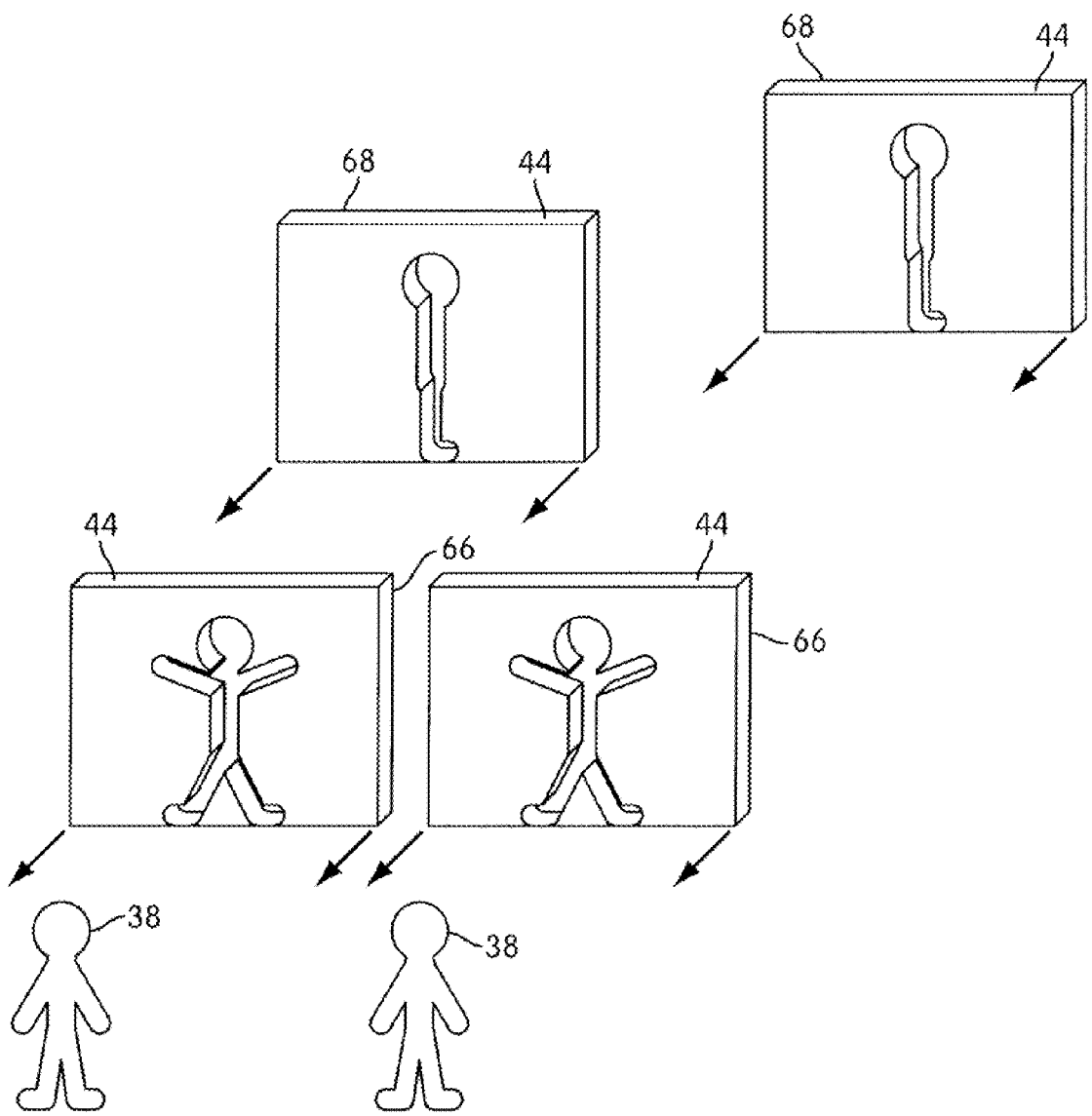
FIG. 12 illustrates a multiplayer mode of a videogame, in accordance with one or more implementations of the invention.

For example, FIG. 12 illustrates implementations of the competitive multi-player mode of the videogame in which separate sets of body position challenge representations 44 are displayed corresponding to representations 38 of separate players. The body position challenge representations 44 illustrated in FIG. 12 include a first set of challenge representations 66 with synchronized timing intervals, and a second set of challenge representations 68 with offset timing intervals.

In some implementations, each of the separate sets of body position challenges includes the same body position challenges in the same order. In such implementations, the players must attempt the same body position challenges either simultaneously, or in succession (e.g., a follow-the-leader type of timing). In some implementations, each of the separate sets of body position challenges includes different body position challenges.

In order to facilitate competition between players of disparate skill levels, the competitive multi-player mode may include one or more handicapping features. For example, different sets of body position challenges may be presented to the players, with the differences between the body position challenges being provided so that a more skilled player is presented with a harder set of body positions. Handicapping players of different skill levels may include adjusting the timing intervals (e.g., shorter timing intervals for more skilled players). In some implementations, handicapping may include requiring a more skilled player to hold body positions corresponding to the body position challenges for a more prolonged period of time to gain the same incentives as a less skilled player receives for holding body positions for a shorter period of time. Other handicapping features may be incorporated into the videogame.

In some implementations of the competitive multi-player mode, the videogame may enable one of the players to have some control over the body position challenges presented to one or more of the other players. This may enable the controlling player to control the difficulty of body position challenges presented to the other player. Control over the difficulty of the body position challenges presented to another player may include one or more of control of timing intervals associated with the body position challenges, selection of specific body position challenges, selection of parameters of body position challenges, and/or control over other aspects of the body position challenges. This may present an aspect of risk-reward to the player, as the posing player will be less likely to conform completely to body position challenges when difficulty is increased, but increased difficulty may have a higher scoring potential for the posing player. Control by a player over the difficulty experienced by a posing player within the videogame may be accomplished via a peripheral control device and/or via gestures that are detected by the body position detector and/or the processor(s).

According to various implementations, the multi-player game may include a competitive multiplayer mode in which one or more players follow the body position of a leading player (e.g., a follow-the-leader mode). In this mode, the leading player may set one or more body position parameters and/or other parameters of a body position challenge for the following player(s) by positioning himself with the desired one or more parameters at predetermined intervals. The following player(s) must then conform themselves to body position challenges having the one or more parameters dictated by the body position of the leading player.

Figure 13:
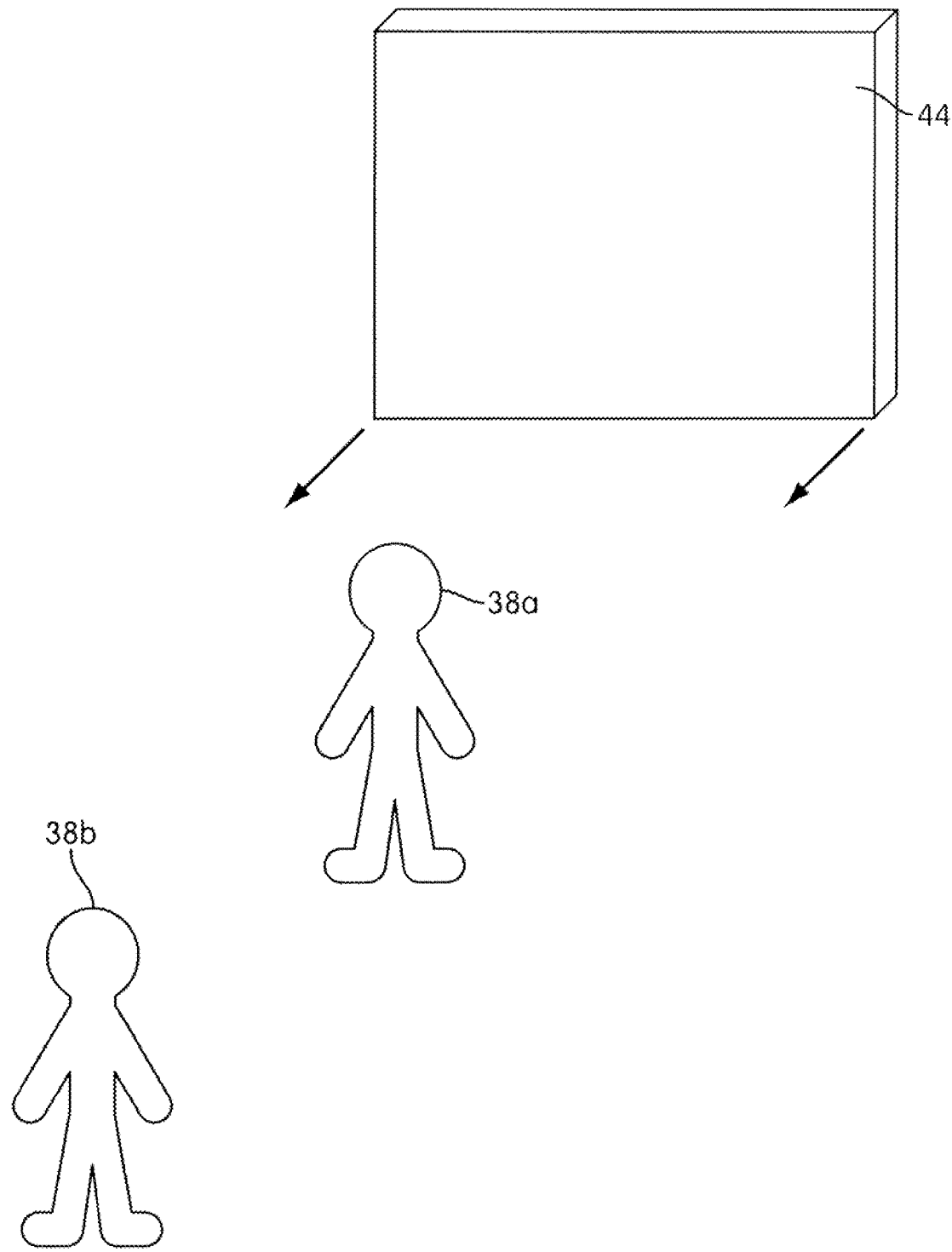
FIG. 13 illustrates a multiplayer mode of a videogame, in accordance with one or more implementations of the invention.
Figure 14:
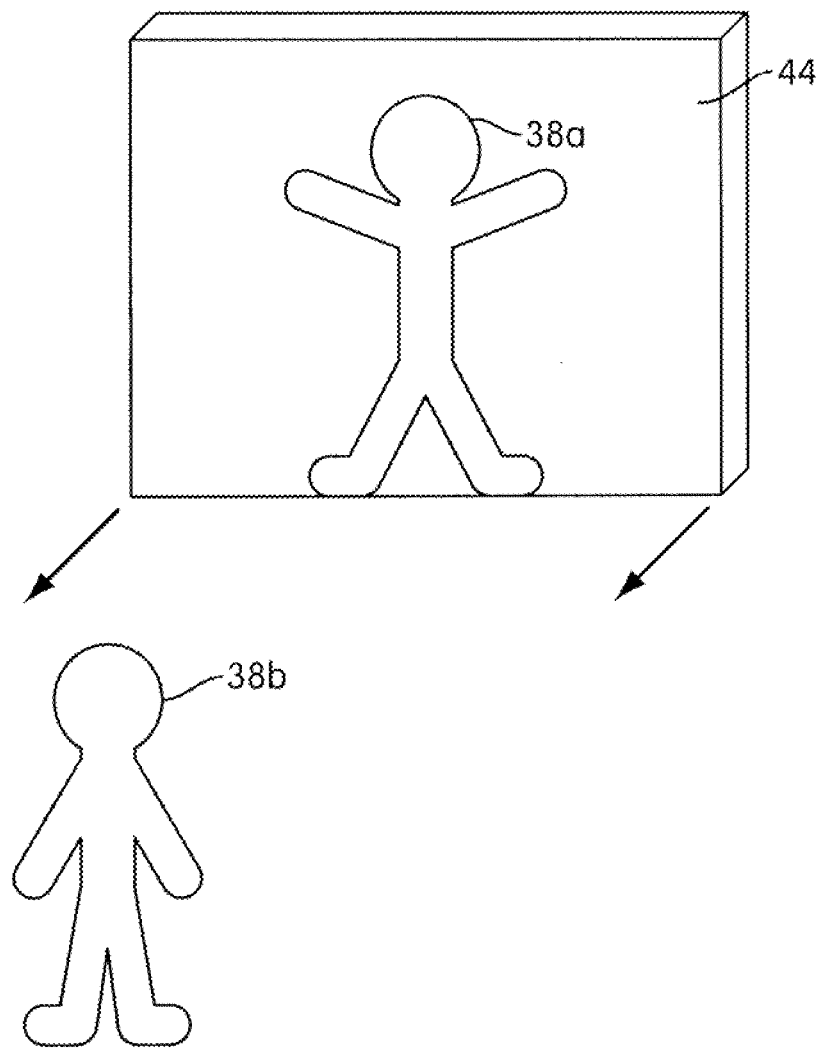
FIG. 14 illustrates a multiplayer mode of a videogame, in accordance with one or more implementations of the invention.
Figure 15:
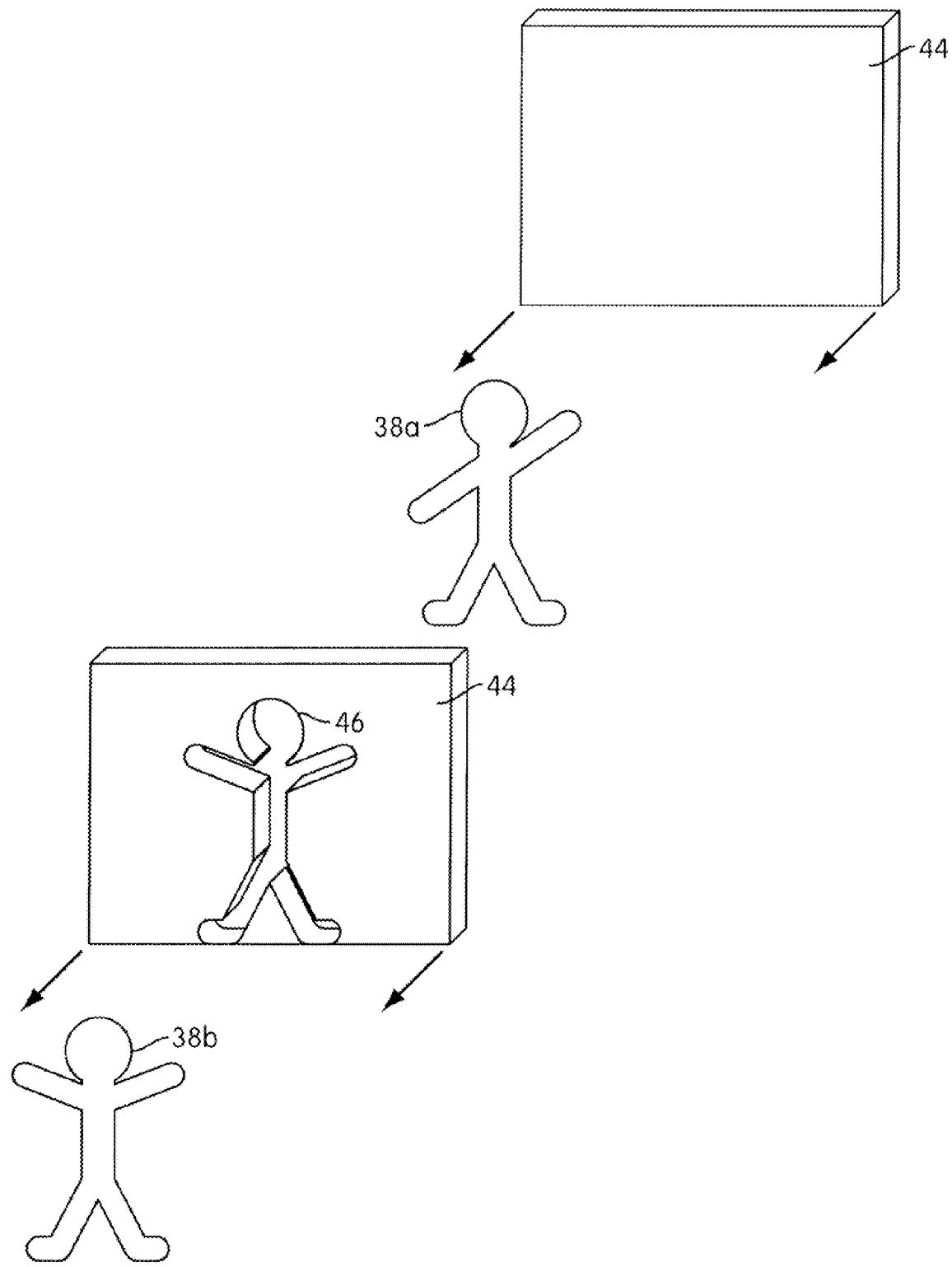
FIG. 15 illustrates a multiplayer mode of a videogame, in accordance with one or more implementations of the invention.

For example, FIG. 13 illustrates a body position challenge representation 44 that is blank (e.g., a blank wall, is not yet associated with body position parameters and/or other parameters) approaching two player representations (illustrated in FIG. 13 as first representation 38a and second representation 38b). Turning to FIG. 14, as the blank body position challenge representation 44 reaches the first representation 38a, the body position of the player corresponding to the first representation 38a sets the body position parameters and/or other parameters of the body position challenge corresponding to body position challenge representation 44. This is depicted in FIG. 15, which shows body position challenge representation 44 now prompting the player associated with second representation 38b to assume the same body position as first representation 38a in FIG. 14, and a new, blank body position challenge representation 44 approaching first representation 38a.

Figure 16:
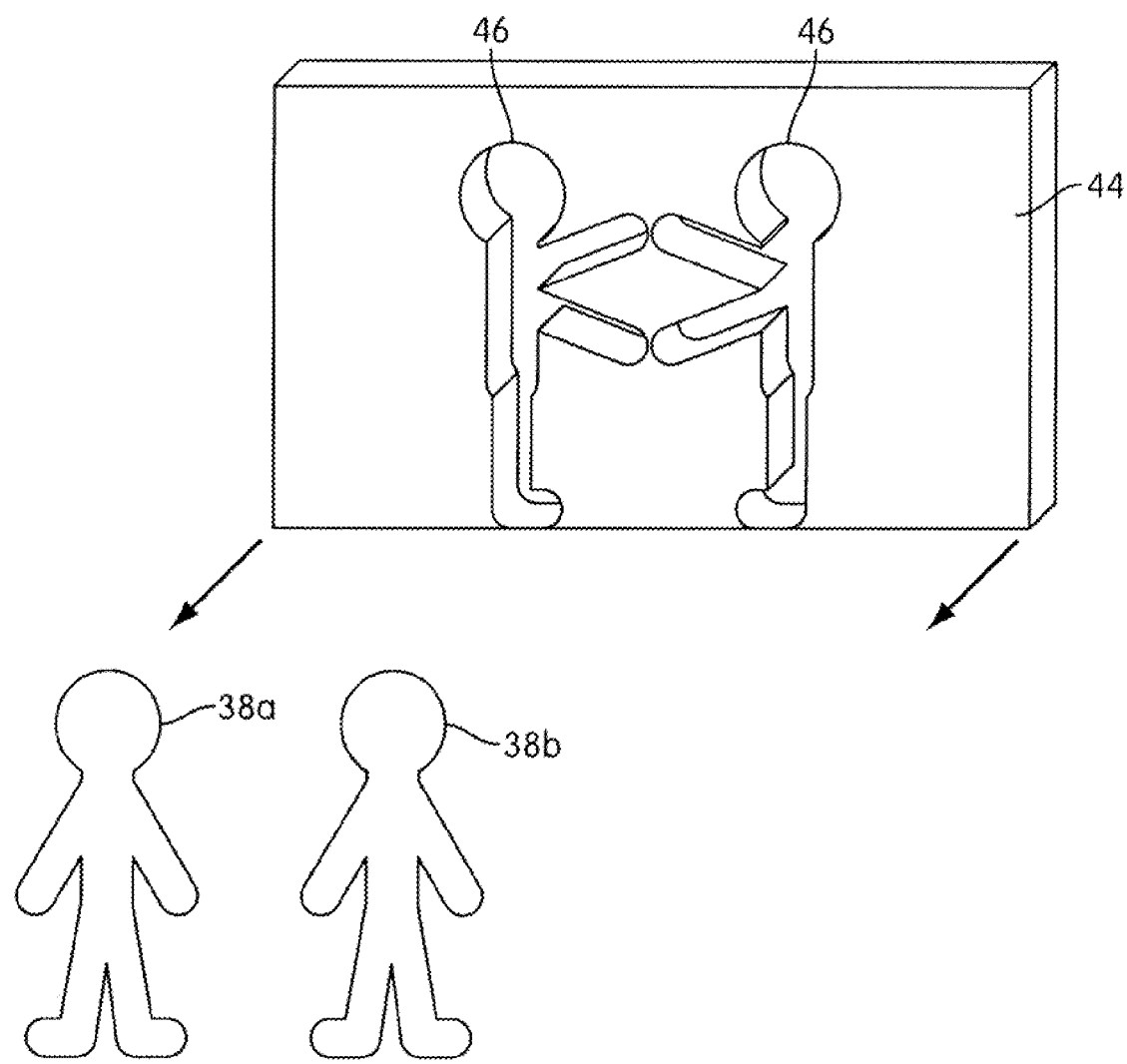
FIG. 16 illustrates a multiplayer mode of a videogame, in accordance with one or more implementations of the invention.

According to various implementations, the videogame may include a cooperative multi-player mode in which two or more players cooperate to position themselves in response to compound body position challenges. For example, FIG. 16 illustrates and example of this cooperative multi-player mode. In FIG. 16, a compound body position challenge representation 44 of a compound body position challenge may be presented to two players corresponding to first representation 38a and second representation 38b. The two players then coordinate their body positions and/or motions (as depicted) to perform the compound body position challenge.

In the cooperative multi-player mode, all of the players may be considered positive objects (e.g., as displayed in FIG. 16). In some instances, one or more of the players may be considered a negative object. In such instances, a player that is a negative object may move and/or position his body such that his representation is between the representation of another player and some reference plane, axis, point, or object (e.g., an approaching body position challenge representation). Portions of the other player represented by the portions of the representation of the other player that are covered by the representation of the player that is a negative object may be removed from the volume and/or are of the other player in analysis of the conformance of the players to cooperative body position challenges.

In some implementations, the videogame provided by videogame system 10 may include a studio mode in which players create body position challenges and/or sequences of body position challenges for use during game play modes such as the single player mode and/or the multi-player modes described above. A player may create a body position challenge by positioning his body in a body position and capturing parameters of the body position using the body position detector, through manipulation of a peripheral controller to dictate body position parameters and/or other parameters, and/or by some combination of these two possibilities. The player may assemble a set of body position challenges into a sequence that can then be presented during game play modes such as the single player mode and/or the multi-player modes described above. In some implementations, the player may share created body position challenges and/or sequences of body position challenges with other players (e.g., over a network).

According to various implementations, the videogame provided by videogame system 10 may include an instructional mode. In the instructional mode, a player may be instructed on how to satisfy various body position challenges. During this mode, the timing intervals associated with individual body position challenges may be increased, or even done away with altogether. In the instructional mode, rather than merely presenting a body position representation (e.g., the form of a opening in the wall), the one or more processors executing the videogame may generate a display that includes additional information instructing the player on how to satisfy the body position challenge. For example, the display may show a picture or diagram of a person with a body position that satisfies the body position parameters and/or other parameters of the body position challenge, a written description of how body members should be positioned to satisfy the body position parameters and/or other parameters of the body position challenge, and/or other information.

In some implementations, in addition to presenting body position challenge representations to the player(s), the videogame may require or incent the performance of other actions. For example, the videogame may require the vocal performance of a piece of music, the manipulation of a musical instrument, a musical instrument-like game controller, and/or other types of controllers, the rhythmic contacting of one or more contact sensors, and/or other the performance of other actions with the conformance to body position challenges. These actions may be performed simultaneously with conformance to body position challenges and/or in separate time periods from conformance with body position challenges (e.g., first satisfy a set of body position challenges, then perform a karaoke part).

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

What is claimed is:

1. A system configured to provide a videogame to a first player and a second player, the system comprising:
one or more body position detectors configured to capture dimensional information that defines the position of a first player and a second player in space;
one or more electronic displays configured to display to the first player and the second player a first set of body position challenge representations and a second set of body position challenge representations, wherein a body position challenge representation represents a body position challenge associated with a corresponding point in time, and wherein the body position challenge representations are displayed to the players in advance of the associated points in time such that while a point in time associated with a given body position challenge representation is approaching, the given body position challenge representation is displayed via the electronic display, wherein the first set of body position challenges and the second set of body position challenges are different;

one or more processors configured (i) to determine one or more body position parameters of the body position of the first player based on the dimensional information captured by the body position detector and to compare the one or more body position parameters of the body position of the first player with one or more body position parameters dictated by the body position challenges of the first set of body position challenges at the points in time associated with the body position challenges of the first set of body position challenges, (ii) to determine one or more body position parameters of the body position of the second player based on the dimensional information captured by the body position detector and to compare the one or more body position parameters of the body position of the second player with one or more body position parameters dictated by the body position challenges of the second set of body position challenges at the points in time associated with the body position challenges of the second set of body position challenges, and (iii) to convey an indication as to which of the first player and the second player is winning a single competitive game in which the first player and the second player are participating that incentivizes conformance with body position challenges at points in time associated with the first set of body position challenges and the second set of body position challenges, wherein the points in time associated with the body position challenges of the first set of body position challenges and the points in time associated with the body position challenges of the second set of body position challenges are the same points in time.

2. The system of claim 1, wherein the one or more body position detectors are contactless and markerless.

3. The system of claim 1, wherein one or more body position parameters comprise one or more of a body silhouette, a three-dimensional shape of one or more body parts, or a relative positioning of specific body parts.

4. The system of claim 1, wherein a relative difficulty between the first set of body position challenges and the second set of body position challenges is determined by the one or more processors based on previously demonstrated skill-levels of the first player and the second player.

5. A method of providing a videogame to a first player and a second player, the method comprising:
   detecting one or more body position parameters of a first player;
   detecting one or more body position parameters of a second player;
   successively displaying body position challenge representations that represent a first set of body position challenges to the first player and the second player, wherein individual body position challenges in the first set of body position challenges are associated with separate points in time, and wherein the body position challenge representations are displayed in advance of the associated points in time such that while a point in time associated with a given body position challenge representation is approaching, the given body position challenge representation is displayed;
   successively displaying body position challenge representations that represent a second set of body position challenges to the first player and the second player, wherein individual body position challenges in the second set of body position challenges are associated with separate points in time, wherein the first set of body position challenges and the second set of body position challenges are different;
   comparing the one or more body position parameters of the body position of the first player with one or more body position parameters dictated by the body position challenges of the first set of body position challenges at the points in time associated with the body position challenges of the first set of body position challenges;
   comparing the one or more body position parameters of the body position of the second player with one or more body position parameters dictated by the body position challenges of the second set of body position challenges at the points in time associated with the body position challenges of the second set of body position challenges;
   conveying an indication as to which of the first player and the second player is winning a single competitive game in which the first player and the second player are participating that incentivizes conformance with body position challenges at points in time associated with the first set of body position challenges and the second set of body position challenges, wherein the points in time associated with the body position challenges of the first set of body position challenges and the points in time associated with the body position challenges of the second set of body position challenges are the same points in time.

6. The method of claim 5, wherein the detections of the one or more body position parameters are contactless and markerless.

7. The method of claim 5, wherein the one or more body position parameters comprise one or more of a body silhouette, a three-dimensional shape of one or more body parts, or a relative positioning of specific body parts.

8. The method of claim 5, wherein a relative difficulty between the first set of body position challenges and the second set of body position challenges is determined based on previously demonstrated skill-levels of the first player and the second player.

* * * * *